(12) United States Patent
Achouche et al.

(10) Patent No.: US 11,132,221 B2
(45) Date of Patent: *Sep. 28, 2021

(54) METHOD, APPARATUS, AND COMPUTER-READABLE MEDIUM FOR DYNAMIC BINDING OF TASKS IN A DATA EXCHANGE

(71) Applicant: Informatica LLC, Redwood City, CA (US)

(72) Inventors: Salim Achouche, Santa Clara, CA (US); Udaya Bhaskar Yalamanchi, Union City, CA (US); Nisheedh Raveendran, Fremont, CA (US)

(73) Assignee: INFORMATICA LLC, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/458,544

(22) Filed: Jul. 1, 2019

(65) Prior Publication Data

US 2019/0324803 A1 Oct. 24, 2019

Related U.S. Application Data

(63) Continuation of application No. 15/360,159, filed on Nov. 23, 2016, now Pat. No. 10,387,195.

(60) Provisional application No. 62/259,638, filed on Nov. 24, 2015.

(51) Int. Cl.
  *G06F 9/46* (2006.01)
  *G06F 9/48* (2006.01)
  *G06F 9/54* (2006.01)

(52) U.S. Cl.
  CPC ............ *G06F 9/4881* (2013.01); *G06F 9/54* (2013.01)

(58) Field of Classification Search
  CPC .................. G06F 9/4881; G06F 9/54
  See application file for complete search history.

(56) References Cited

U.S. PATENT DOCUMENTS

2015/0052530 A1* 2/2015 Jacobson ............... G06F 9/46
  718/102

* cited by examiner

*Primary Examiner* — Wissam Rashid
(74) *Attorney, Agent, or Firm* — Amardeep S. Grewal; Reed Smith LLP

(57) ABSTRACT

Apparatus, computer-readable medium, and computer-implemented method for dynamic binding of tasks in a data exchange, including generating an execution plan for the data exchange comprising a plurality of streams, each stream corresponding to a pairing of a producer task and a consumer task and comprising a producer task identifier and a consumer task identifier, binding each producer task to a node at execution time by associating a corresponding producer task identifier with a corresponding node identifier of the node, binding each consumer task to a node at execution time by associating a corresponding consumer task identifier with a node identifier of the corresponding node, and routing an output of each producer task from a node bound to the producer task to a node bound to a paired consumer task by writing the output to a stream corresponding to the pairing of the producer task and the consumer task.

18 Claims, 26 Drawing Sheets

METHOD, APPARATUS, AND COMPUTER-READABLE MEDIUM FOR DYNAMIC BINDING OF TASKS IN A DATA EXCHANGE

RELATED APPLICATION DATA

This application is a continuation of U.S. Nonprovisional application Ser. No. 15/360,159, filed Nov. 23, 2016, which itself claims priority to U.S. Provisional Application No. 62/259,638, filed Nov. 24, 2015, the disclosures of which are hereby incorporated by reference in their entirety.

BACKGROUND

Batch Processing Systems express jobs in terms of a Directed Acyclic Graph (DAG) of tasks (or stages). Each task is partitioned (based on the input data) for parallel processing and includes producer stages and consumer stages which rely on the output of the producer stages. The producer stages are executed on producer nodes and the consumer stages are executed on consumer nodes. Intermediary data flows through these tasks in many forms, such as one-to-one, one-to-many, many-to-one, and/or, many-to-many. Many group based operations (such as aggregation, join, sort, etc.) usually require many-to-many data exchanges referred to as "data shuffle."

FIG. 1 illustrates an example of data shuffle in a data exchange. Batch systems use data shuffle across computers whenever a data transformation (which operates on a group of rows) uses a new set of key input columns (e.g., Sort, Join, and Aggregate). This data shuffle operation is paramount to the overall batch system's performance, fault tolerance, and scalability characteristics.

The data shuffle phase is network intensive. Most output of a producer stage is sent to the next consumer stage. In Big Data, fault tolerance and task orchestration requirements add additional challenges. For example, intermediary data is usually saved on disk before being sent. Although disk drives can usually operate at 80 MB/sec of sequential concurrent reads and writes, this throughput dramatically decreases when the number of accessed files increases.

In theory, intermediary data is expected to be read from the Operating System (OS) buffer cache. In practice, this is not the case. Since the cache is shared across file systems, including Hadoop Distributed File System (HDFS), the OS cannot know what data will be read again soon (HDFS is a Java-based file system that provides scalable data storage and was designed to span large clusters of commodity servers).

Additionally, the number of "spill files" for a particular set of tasks is associated with multiple factors, such as the number of producers and consumers, the partition size, and data exchange and orchestration logic. Spill files are files that are created on disk if there is not sufficient memory to execute a command (such as query) in memory.

An inefficient data exchange impacts the overall runtime of small and large jobs. For both types of jobs data is always spilled to disk and large and smaller jobs can be executed in parallel. For this reason, optimizers try to filter out as much intermediary data or eliminate data shuffle altogether (e.g., Map side Join).

FIG. 2 illustrates the map phase performed by a mapper in a Map-Reduce system. The Map-Reduce system will typically include many mappers on one or more producer nodes (producers) which can operate in parallel. At step 1 the input for the map step is read by the mapper. At step 2 the map step is performed. This step maps the input data to the corresponding output which will be input to the reduce step. For example, if the input was a specific data value in a column of a table, the map step could identify other data values occurring in the rows of that particular column of data. At step 3 the output data is sorted and at step 4 the output data is stored (using a hash function) on disk. At step 5 the data can be read and merged so that all of the output data which is designated for a particular reducer (which is on a consumer node) is consolidated into a single file. At step 6 each of these output files can be written to memory. Therefore, the map step for each mapper will produce a file for each reducer which is a consumer of that mapper. Each of these files will contain the corresponding output data for that mapper.

FIG. 3 illustrates the reduce phase performed by a reducer on a consumer node in a Map-Reduce system. At step 1 the consumer node, reducer, or the map-reduce infrastructure will query the mapper's local disk to determine where the corresponding input data for that reducer is located (this is the output data from the map step). Then at step 2 this data (which will include a file for each mapper that maps to that reducer) is read from the network. This data is then written to disk in step 3 and then read and merged at step 4. This can be performed by merge-sorting the read data. In this step, all of the read files for that particular reducer are merged and sorted. At step 5 the merged and sorted data is written to disk. At step 6 this data is then reduced into one logical file. At step 7 this is data is written to disk for the next cycle of map-reduce or for output.

As described above, batch systems such as MapReduce save mappers data on local disk and then on HDFS (reducer output). This guarantees fault tolerance and provides linear scalability. However, its performance is degraded by the excessive use of disk IO and the requirement to publish each MapReduce result to HDFS.

New batch systems like Spark and Tez address some of these deficiencies by eliminating the need to commit intermediary data to HDFS and by optimizing small data shuffle (in-memory).

Map-Reduce and Spark data shuffles use a "pull" model. In Spark, the HDFS-write-read (WR) barrier (from Map-Reduce) is removed, resulting MRR (Map-Reduce-Reduce) and the Data Exchange logic is contained within each Spark Executor (an executor is an execution device that executes a particular task). Every map task writes out data to local disk, and then the reduce tasks make remote requests to fetch that data. Originally, the total number of files created was M×R, where M is total number of producers (mappers) and R is total number of consumers (reducers). Shuffle consolidation improvements were able to decrease this number to C×R, where C is the maximum number of concurrent producers. Even with this change, users often run into the "too many open files" limit when running jobs with non-trivial numbers of reducers. Addditionally, Spark originally utilized only a "hash" based shuffle unlike the "sort" based shuffle of Map-Reduce. This Data Shuffle suffers from costly Java Virtual Machine (JVM) costly garbage collection.

Tez is a pluggable distributed processing framework. Unlike Spark, higher level applications have to plugin transformation logic. Tez Data Shuffle is similar to Spark and previously offered in-memory data-shuffle, which was later removed. Similar to Spark, the Data Exchange logic is contained within each Tez Executor. In Tez, the application is responsible for driving the execution logic including data exchanges.

New batch systems like Spark and Tez address some of the deficiencies of MapReduce by eliminating the need to commit intermediary data to HDFS and by optimizing small data shuffle (in-memory). However, as discussed above, the data exchange logic for both Spark and Tez is contained within each executor. This is not optimal since a data shuffle framework which is currently embedded within batch processor engines complicates fault tolerance and prevents effective resource utilization (memory based caching) and input-output (IO) optimization across multiple executors.

For example, in large jobs, it might be necessary to store shuffle data on disk to deal with potential faults. In this case, persisting (storing) data closer to a consumer executor (an executor executing a job which is a consumer job and receives data from a producer job) would optimize network usage as data is sent through the network continuously as opposed to small bursts (e.g., when new consumer tasks start execution). However, this pre-fetch optimization is not done because (for large jobs) the location of consumer task execution not known to each producer executor a priory.

Additionally, since the data exchange logic is contained within executors, both Spark and Tez rely on static scheduling of tasks to particular executors. This can lead to underutilization of faster processors and inefficient processing of jobs.

DETAILED DESCRIPTION

While methods, apparatuses, and computer-readable media are described herein by way of examples and embodiments, those skilled in the art recognize that methods, apparatuses, and computer-readable media for performing a data exchange are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Applicant has discovered a method, apparatus, and computer-readable medium for performing a data exchange and a data exchange framework which optimizes disk IO during a data exchange, optimizes resource utilization, and utilizes private memory caching to eliminate unnecessary disk writes and reads for small jobs. Additional benefits of the present system are described further below.

Figure 1:
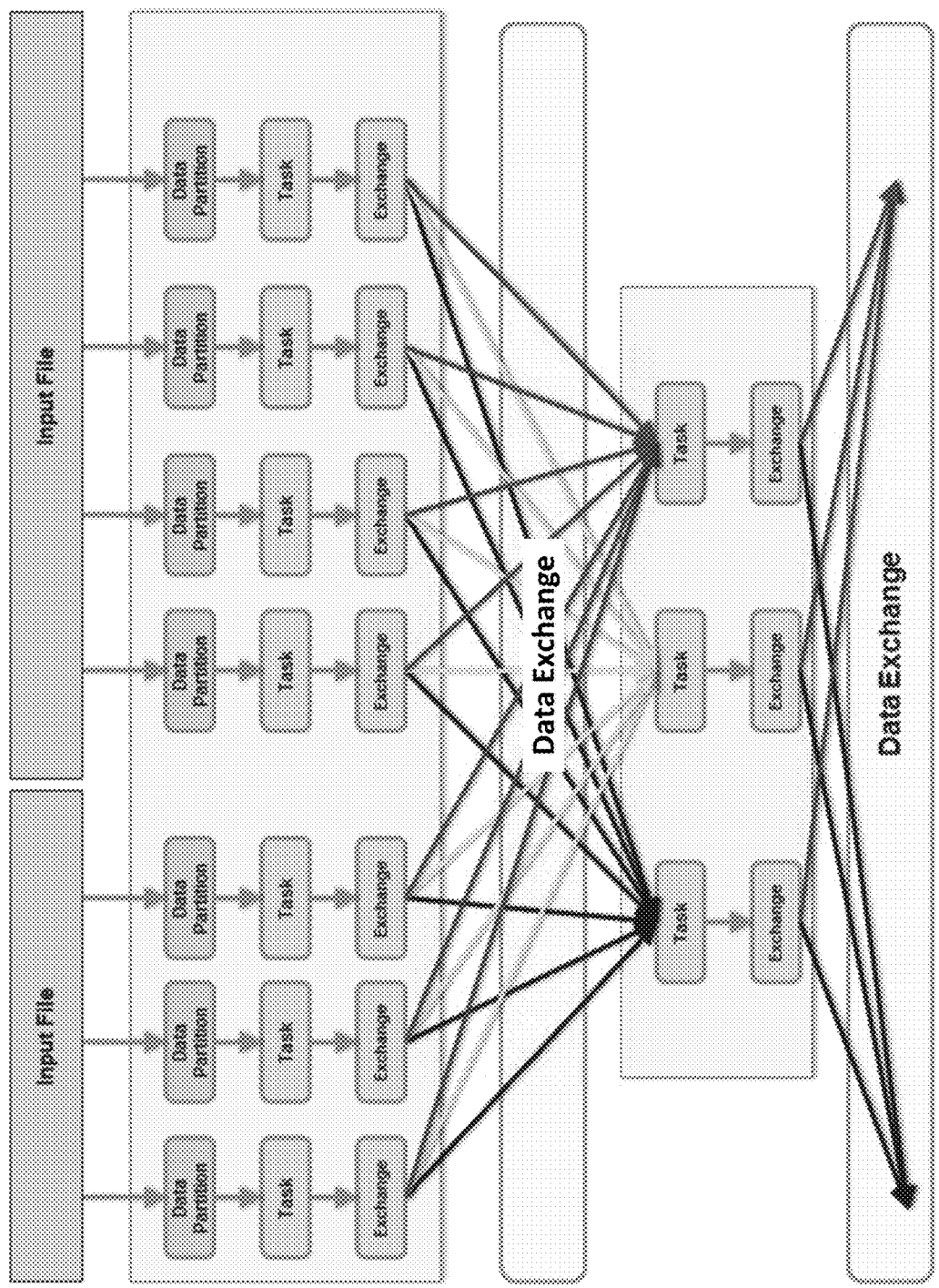
FIG. 1 illustrates an example of data shuffle in a data exchange.
Figure 2:
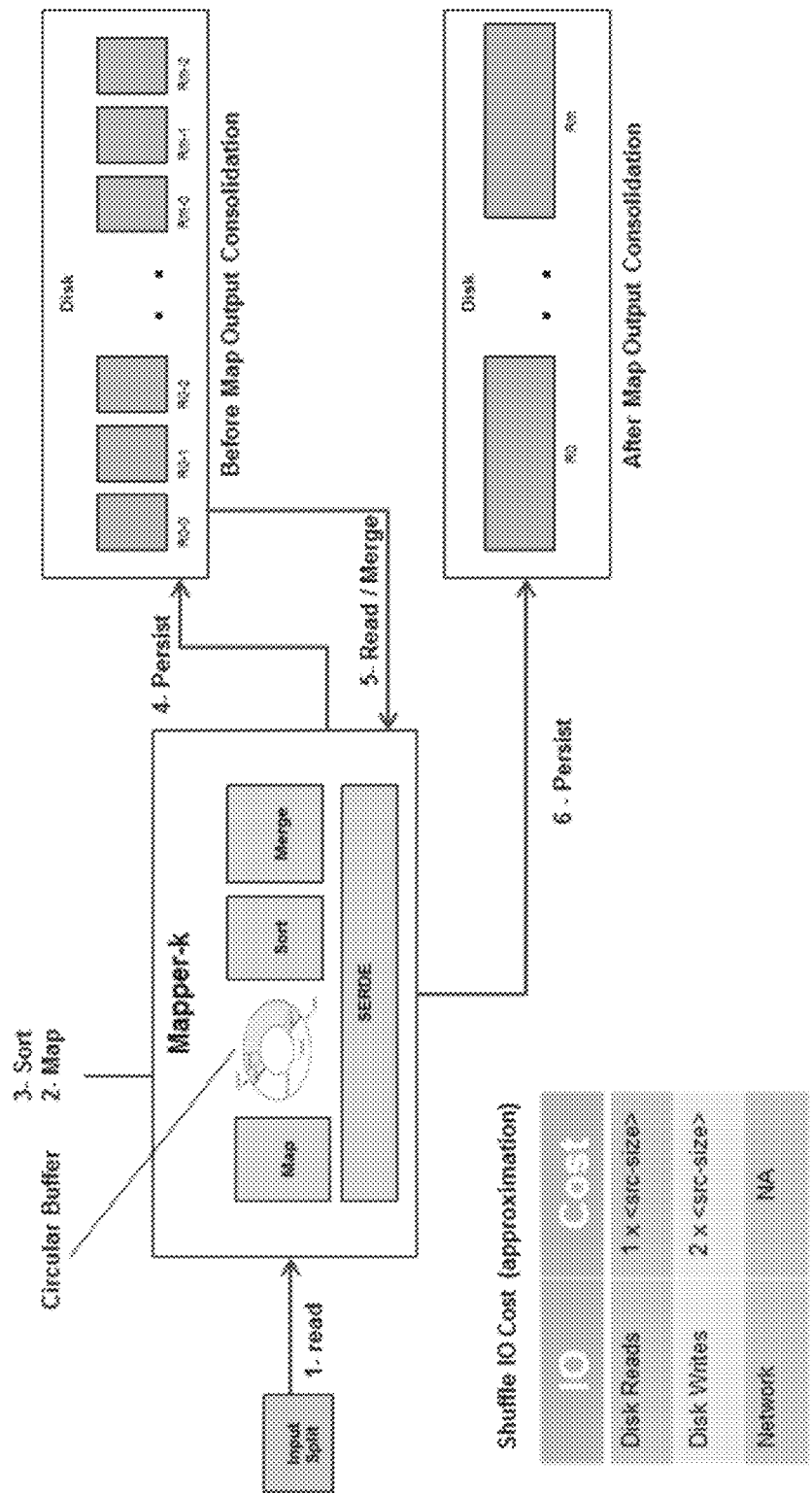
FIG. 2 illustrates the map phase performed by a mapper in a Map-Reduce system.
Figure 3:
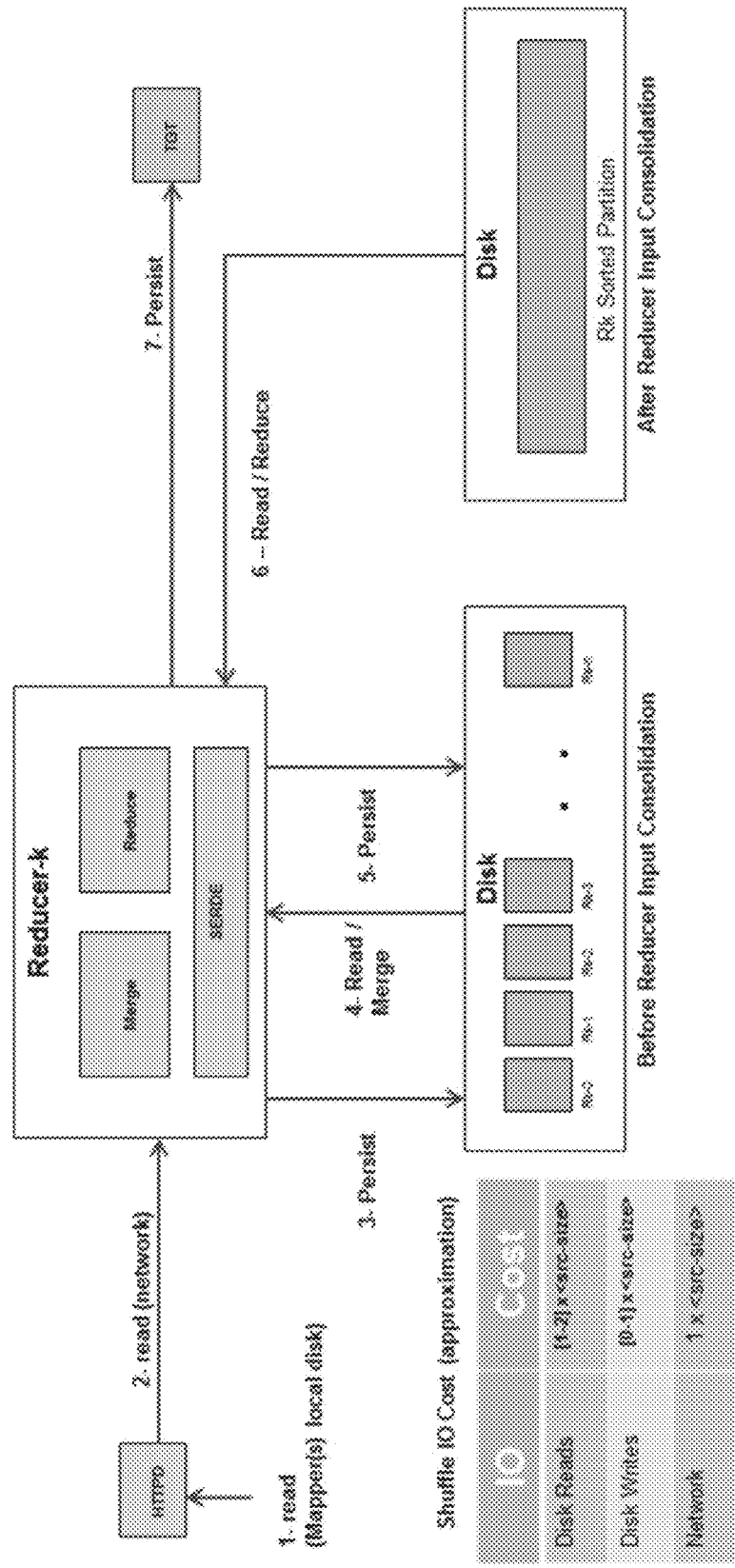
FIG. 3 illustrates the reduce phase performed by a reducer on a consumer node in a Map-Reduce system.
Figure 4:
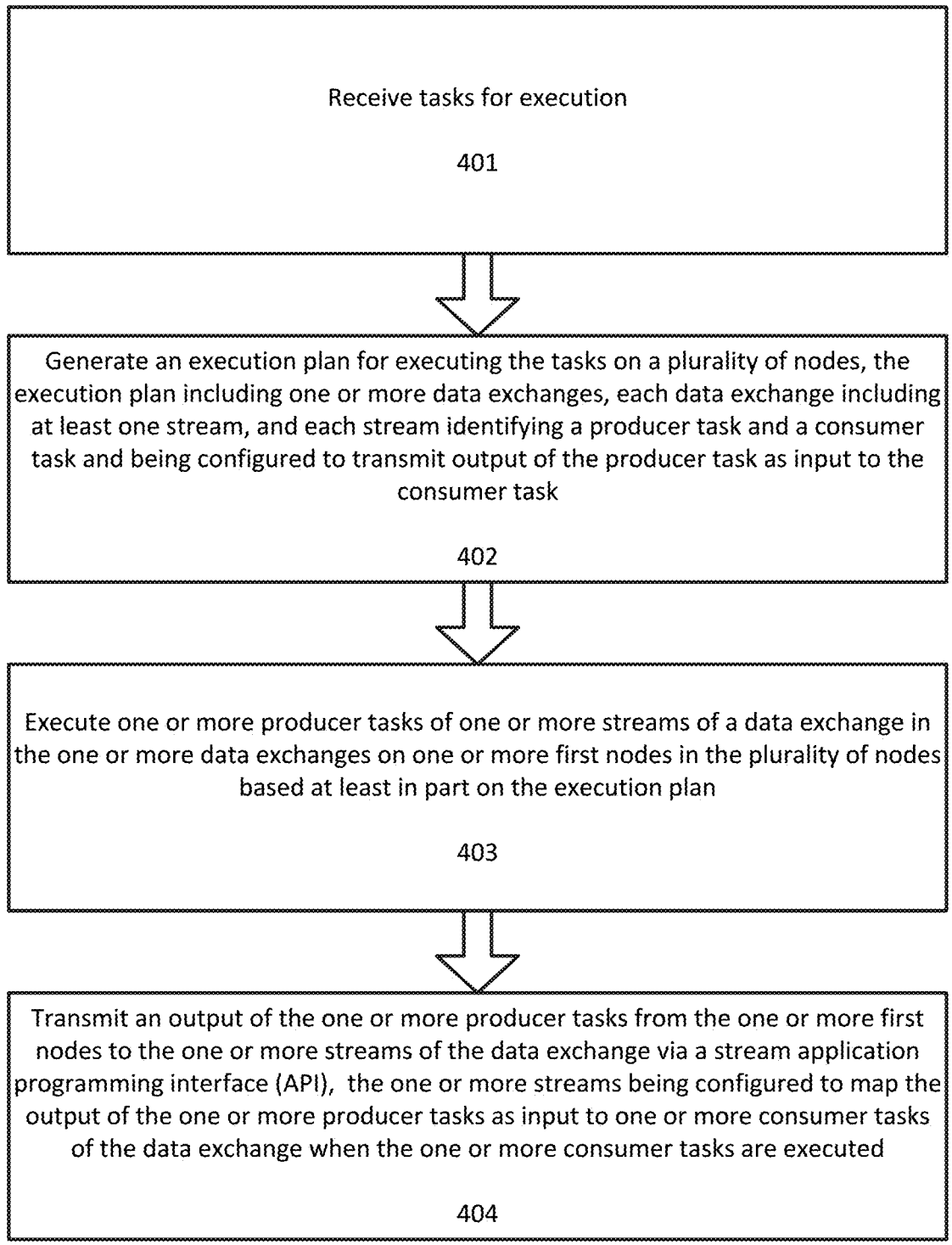
FIG. 4 illustrates a flowchart for performing a data exchange according to an exemplary embodiment.

FIG. 4 illustrates a flowchart for performing a data exchange according to an exemplary embodiment. At step 401 a plurality of tasks are received for execution. The tasks can be received by an orchestrator component which is part of the data exchange framework. The various components of the data exchange framework are described further with respect to FIGS. 5-6.

Figure 5:
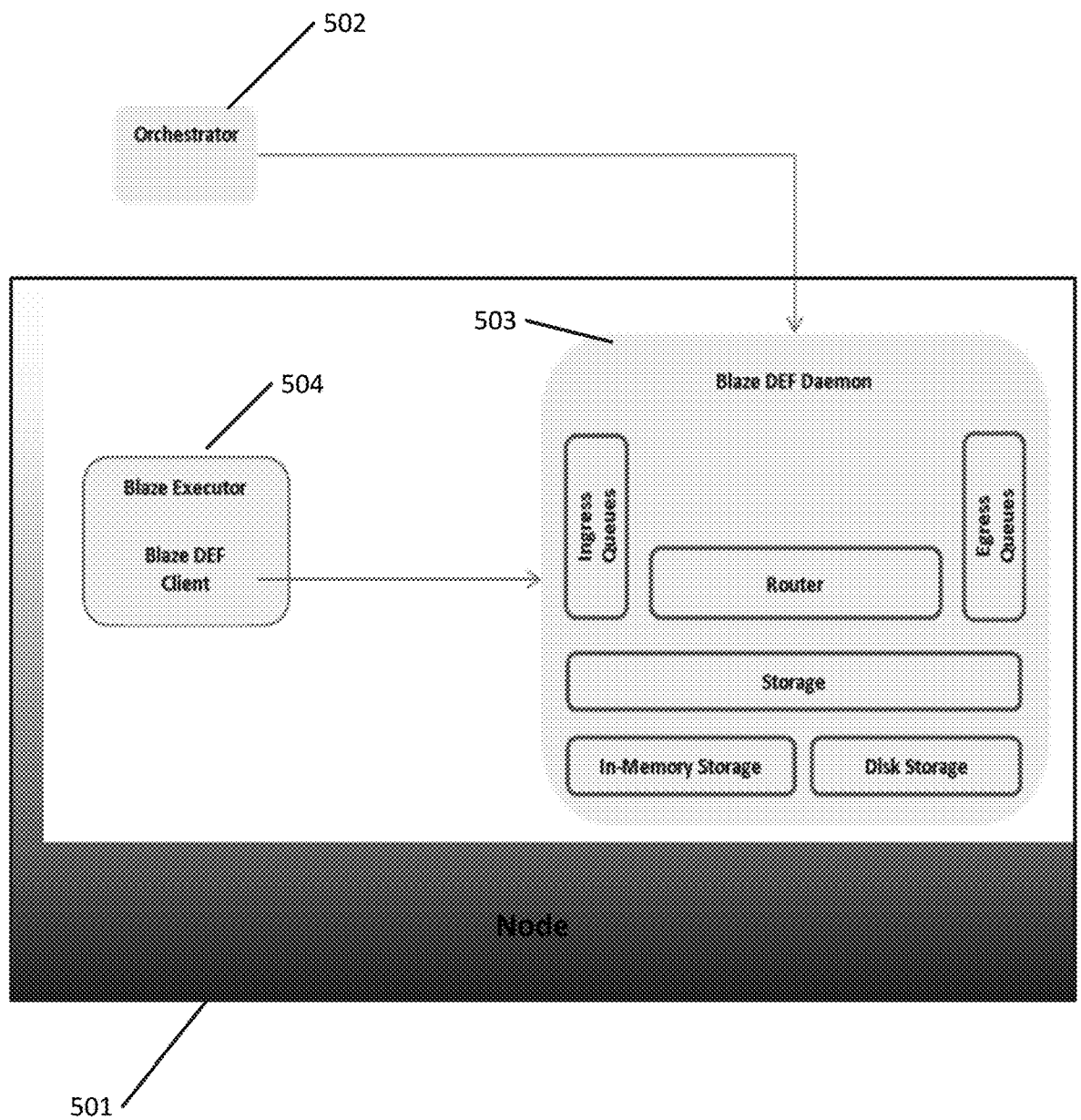
FIG. 5 illustrates components of the data exchange system and framework according to an exemplary embodiment.

FIG. 5 illustrates components of the data exchange system and framework according to an exemplary embodiment, referred to as the Blaze Data Exchange Framework ("Blaze DEF"). As shown in FIG. 5, the Blaze DEF includes an orchestrator 502, and one or more nodes, such as node 501.

The components of each node in the Blaze DEF include one or more Blaze executors, such as executor 504. The executors are processors which perform tasks and provide and receive the data which is exchanged.

Each node also includes a DEF Daemon 503, which encapsulates the data exchange logic and which is responsible for communication between executors and the orchestrator. A daemon is a computer program that runs as a background process, rather than being under the direct control of an interactive user. As shown in FIG. 5, each of the executors use a DEF client to communicate with the DEF Daemon 503 and participate in the data exchange.

The orchestrator 502 manages the scheduling of tasks and facilitates distribution logic by providing inter-daemon registration, exchanging optimization hints, responding to intermediary data cleanup requests, and performs several other functions, as described herein.

Figure 6:
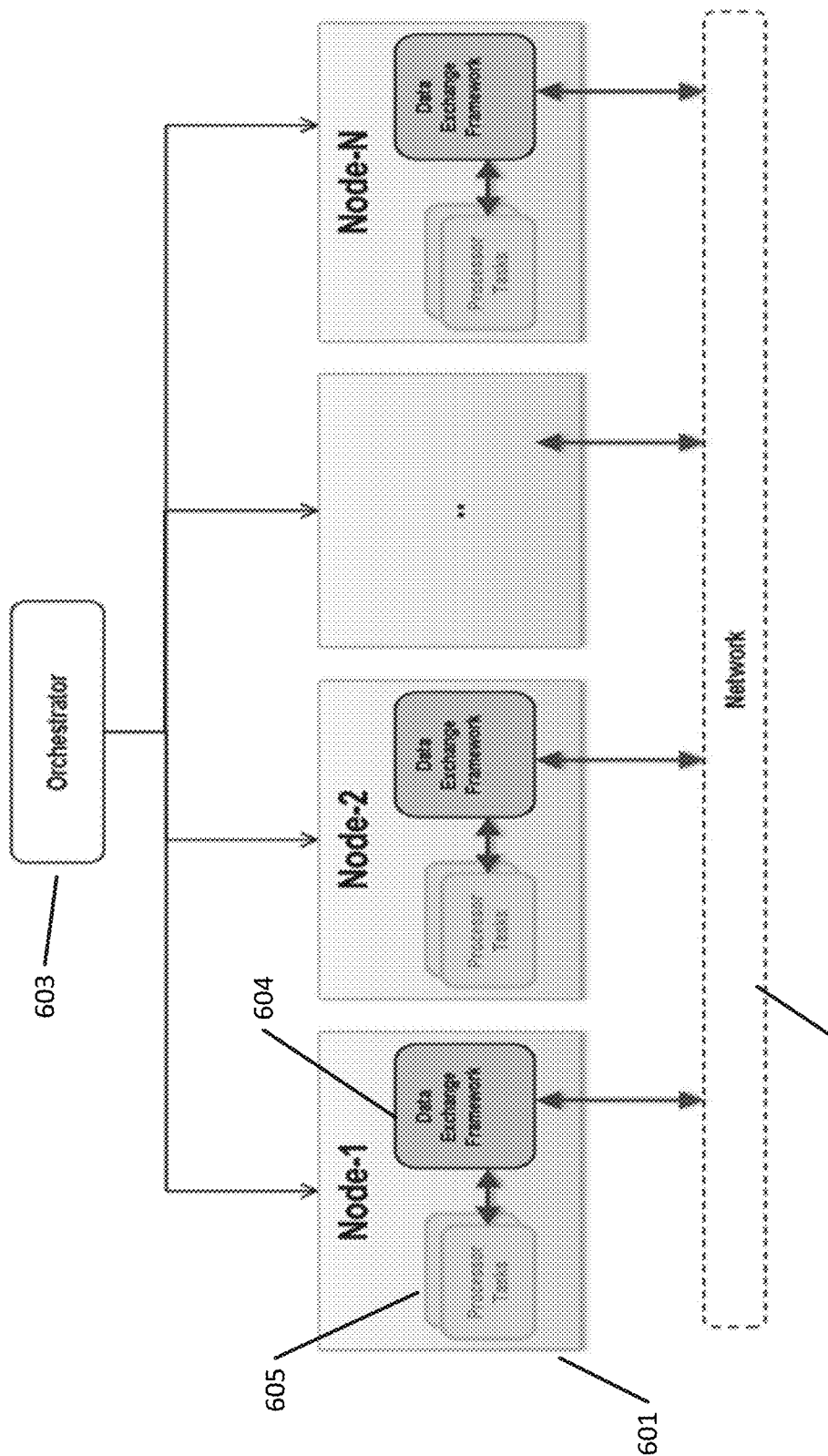
FIG. 6 illustrates the Blaze Data Exchange Framework (DEF) topology according to an exemplary embodiment.

FIG. 6 illustrates the Blaze DEF topology according to an exemplary embodiment. As shown in the figure, each Worker Node 601 (where the data exchange is taking place) can contain one or multiple batch processors 605 (also referred to as Executors). These processors can communicate with the local DEF daemon (one per node). All inter-node data exchange can take place via the data exchange framework 604, including DEF daemons.

Blaze's DEF can be implemented as a distributed peer-to-peer service. It can be coded in C++ since it doesn't run any external plugin. DEF daemons can be lazily started on worker nodes. Blaze's Grid Manager (GM—not shown) is responsible for resource allocation. Blaze Services can handle multiple jobs. One or more Blaze Orchestrators orchestrate grid task scheduling. GM and Orchestrators assist in DEF daemons discovery, directory lookups, and exchange hints. As shown in FIG. 5, each executor runs a DEF client and clients only communicate with the local DEF daemon.

Returning to FIG. 4, at step 402 an execution plan for executing the plurality of tasks on a plurality of nodes is generated. The execution plan includes one or more data exchanges, which is assigned a universally unique identifier (UUID). Each data exchange includes at least one stream. Therefore, each set of streams in each data exchange is assigned a UUID. Each stream identifies a producer task Pi in the plurality of tasks and a consumer task Cj in the plurality of tasks and is configured to transmit output of the producer task as input to the consumer task.

Since producer tasks and consumer tasks are assigned logical identifiers, this allows for late and/or multiple bindings to specific executors and nodes. For example, any node can be a producer node (if it is executing a producer task) or a consumer node (if it is executing a consumer task), depending on the particular data exchange and/or streams involved. Each of these identifiers is therefore assigned for a particular data exchange (including the set of streams for that data exchange). A node/executor that is a producer node/producer executor in a first data exchange could be a consumer node/consumer executor in a later data exchange. As will be discussed further below, each of the streams allows the output of a producer to be mapped to a consumer dynamically, depending on where the consumer task which takes the input of the producer task is being executed.

Figure 7:
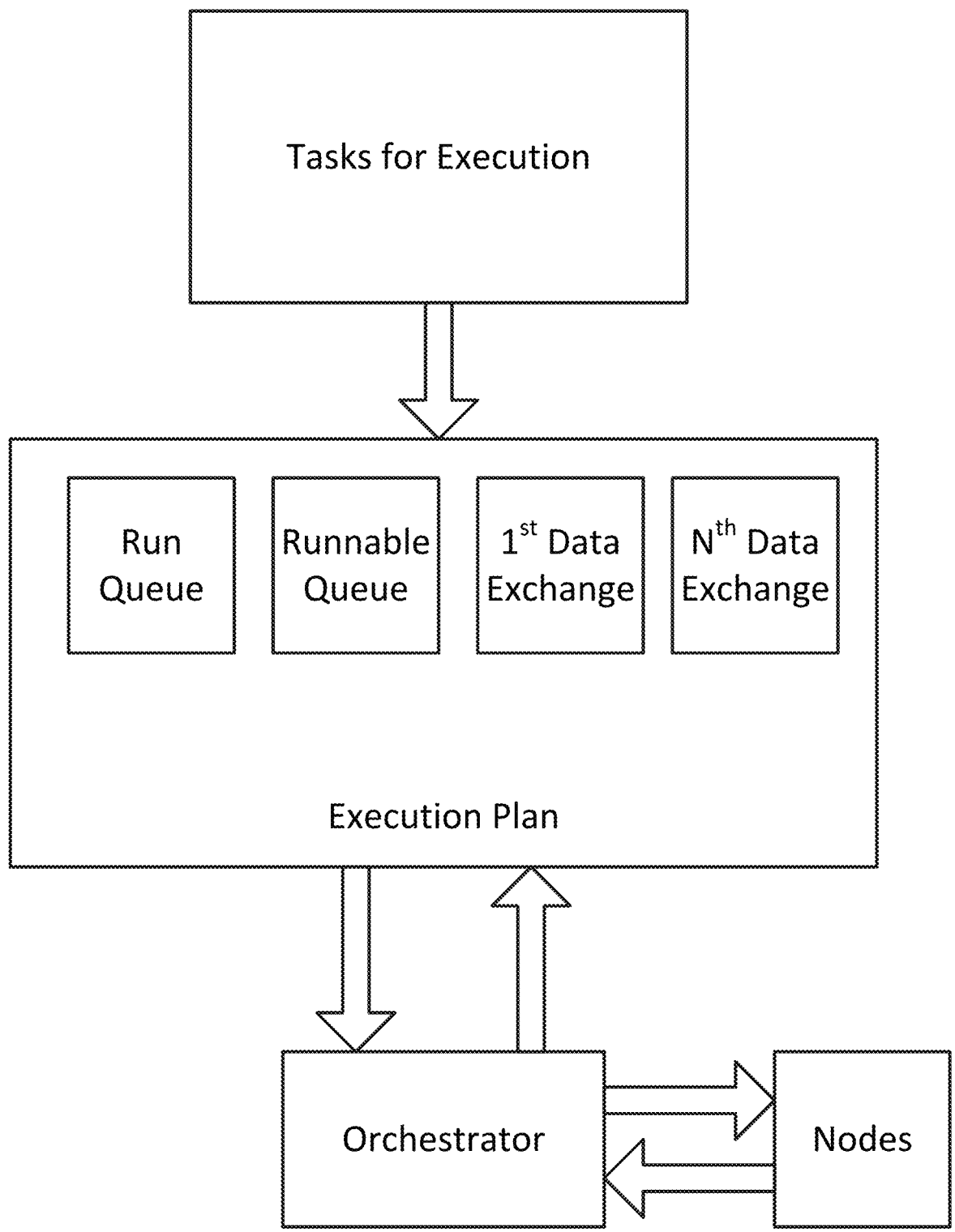
FIG. 7 illustrates the process flow and components described in the flowchart of FIG. 4 in the context of the Blaze DEF.

FIG. 7 illustrates the process flow and components described in the flowchart of FIG. 4 in the context of the Blaze DEF. As shown in FIG. 7, the tasks for execution are received by the Blaze Engine (not shown) and used to generate an execution plan for executing the plurality of tasks on a plurality of nodes. This execution plan can include one or more data exchanges, each data exchange including one or more streams which specify a producer task and a consumer task. The execution plan is utilized by the orchestrator to execute the various tasks, along with a run queue and a runnable queue. The run queue indicates tasks which can be scheduled for execution at the moment and the runnable queue indicates tasks which cannot yet be scheduled for execution (for example, due to limited resources or dependence on other tasks). The orchestrator then communicates with the various nodes to implement and coordinate execution of the tasks in the execution plan.

Figure 8:
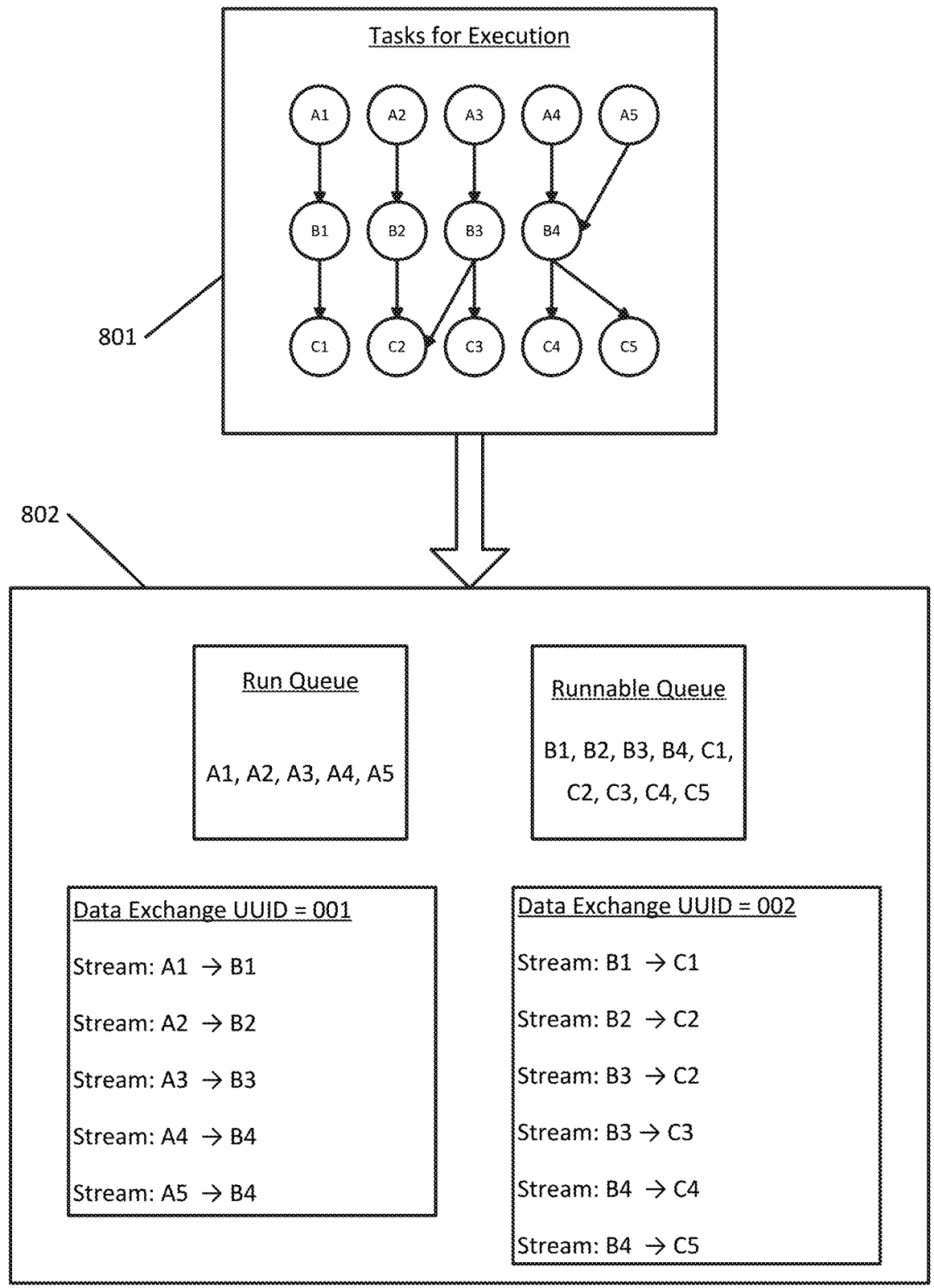
FIG. 8 illustrates the generation of data exchanges of an execution plan for a sample set of tasks according to an exemplary embodiment.

FIG. 8 illustrates the generation of data exchanges of an execution plan for a sample set of tasks according to an exemplary embodiment. Box 801 illustrates a plurality of tasks, A1-A5, B1-B4, and C1-C5. The arrows indicate dependencies between the tasks. For example, task B4 is dependent on the output of tasks A4 and A5 and the output of task B4 is used for tasks C4 and C5.

Box 802 illustrates the information available to the orchestrator, including two data exchanges, UUID=001 and UUID=002, which are generated as part of the execution plan. As shown in FIG. 8, each of the data exchanges includes a set of streams. For example, the data exchange with UUID=001 includes 5 streams and the data exchange with UUID=002 includes 6 streams. Each of the streams indicates a producer task and a corresponding consumer tasks. For example, in stream A1→B1, the producer task is task A1 and the consumer task is task B1, meaning the output of A1 needs to be provided to B1. Box 802 also illustrates the run queue and the runnable queue, both of which are used by the orchestrator to coordinate scheduling of tasks. Assuming, for the purpose of this example, that there are only five executors available to execute tasks at any given time, the run queue can initially include tasks A1-A5 and the remaining tasks can be placed in the runnable queue.

Returning to FIG. 4, at step 403 one or more producer tasks of one or more streams of a data exchange in the one or more data exchanges are executed on one or more first nodes in the plurality of nodes based at least in part on the execution plan. At step 404 an output of the one or more producer tasks is transmitted from the one or more first nodes to the one or more streams of the data exchange via a stream application programming interface (API). As will be explained further, the one or more streams are configured to map the output of the one or more producer tasks as input to one or more consumer tasks of the data exchange when the one or more consumer tasks are executed. Steps 403-404 are explained in more detail with regard to FIGS. 9-10.

Figure 9:
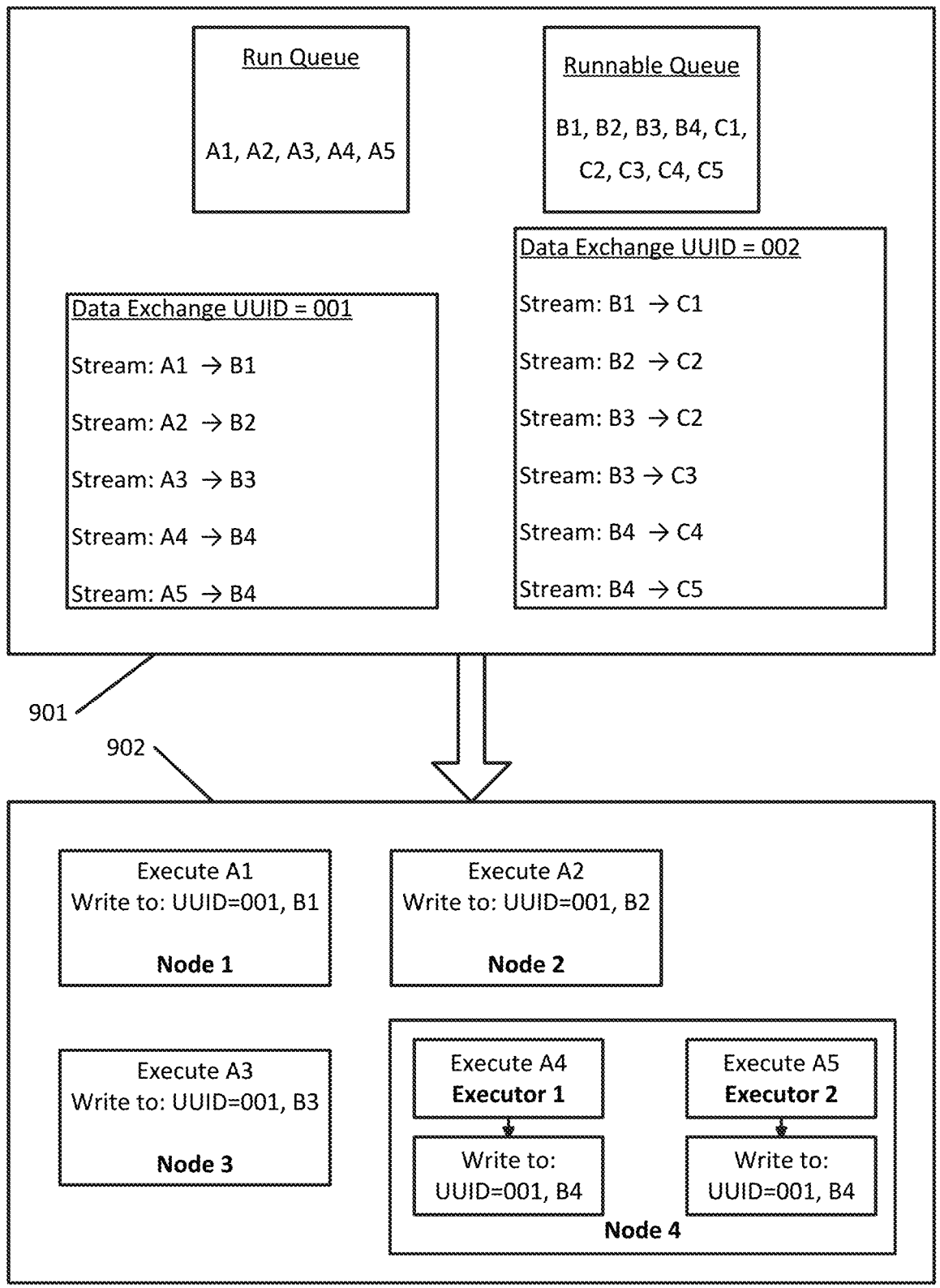
FIG. 9 illustrates the execution of one or more producer tasks on one or more first nodes according to an exemplary embodiment.

FIG. 9 illustrates the execution of one or more producer tasks on one or more first nodes according to an exemplary embodiment. Box 901 is similar to box 802 in FIG. 8 and illustrates the information utilized by the orchestrator when scheduling tasks, including the two data exchanges which are part of the execution plan, the run queue, and the runnable queue.

Box 902 illustrates four nodes which are used to execute tasks. Nodes 1-3 each have one executor, which is not shown. Node 4 includes two executors, executor 1 and executor 2. As shown in FIG. 9, each of the tasks in the run queue is assigned to a node and an executor in the plurality of nodes. For example, task A1 is executed on the single executor of Node 1 and task A5 is executed on the second executor of Node 4.

The output of each of the tasks is written to a corresponding stream via a stream API. More specifically, the output is transmitted from each executor to a local daemon for the node and then written to the corresponding stream via the stream API by the local daemon. The daemon can specify an output address for each of the tasks executed on its executors which specifies the appropriate stream. For example, as shown in FIG. 9, the output of task A1 is written to a stream in data exchange UUID=001 with consumer task B1. Since the producer task is currently being executed on the node, there is no need to identify the producer node to identify the appropriate stream. In this case, the local daemon for node 1 knows that task A1 is being executed on its executor and will send the output of task A1 to stream A1→B1 in data exchange UUID=001. In another example, the local daemon of node 4 knows that task A4 is being executed on its first executor and writes the output task A4 to the stream having UUID=001, producer task A4, and consumer task B4. The local daemon of node 4 also knows that task A5 is being executed on its second executor and writes the output task A5 to the stream having UUID=001, producer task A5, and consumer task B4.

Figure 10:
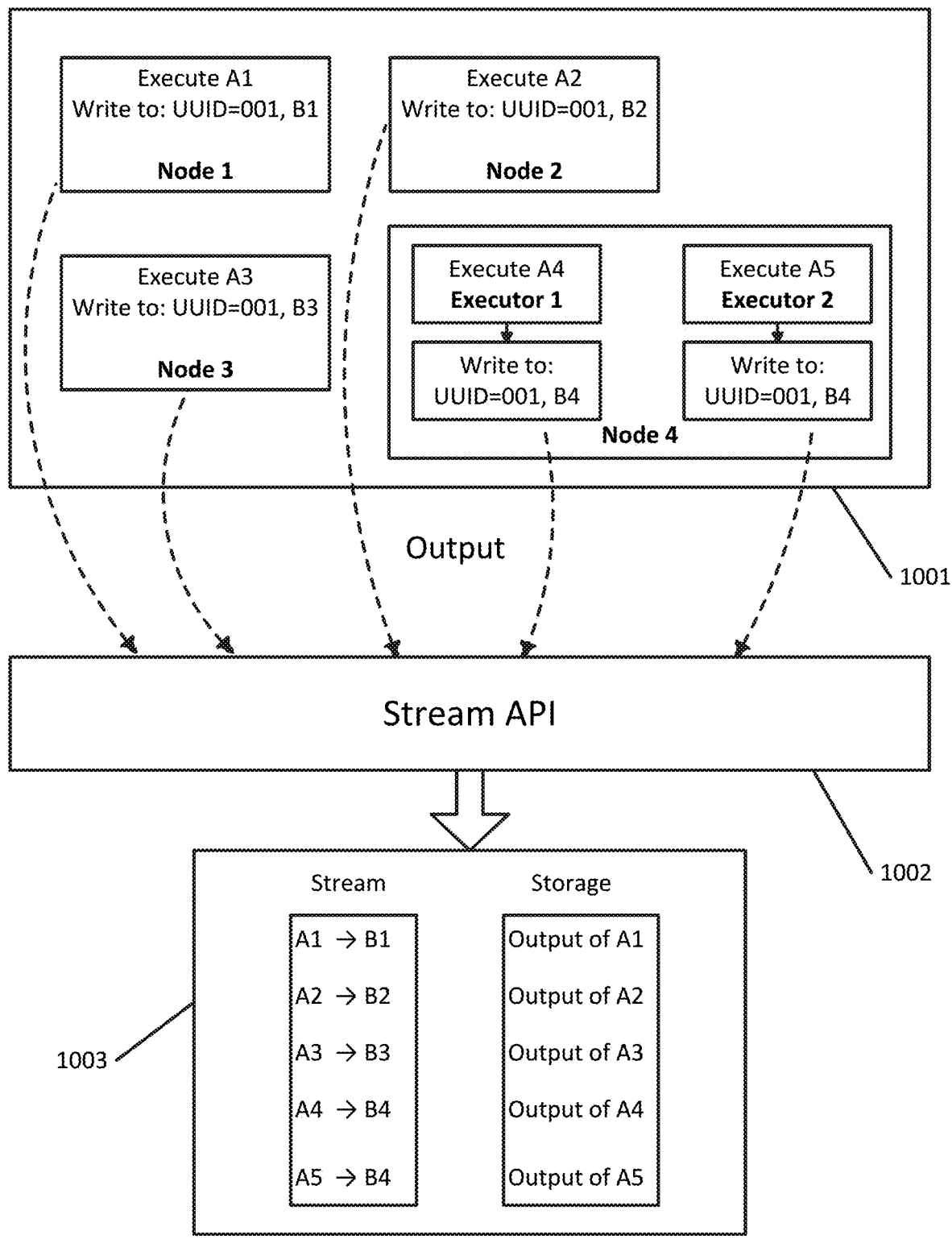
FIG. 10 illustrates the writing of output data to corresponding streams according to an exemplary embodiment.

FIG. 10 illustrates the writing of output data to corresponding streams according to an exemplary embodiment. The local daemons of the nodes shown in box 1001 each write the output of the tasks executing on their executors to the corresponding streams 1003 via the stream API. The stream API allows the local daemon to specify a stream by producer task, consumer task, and UUID and stores the output of the producer task in the stream for use by the consumer task when the consumer is executed. Each stream in the set of streams 1003 and UUID provides a logical identifier with which to locate the output of a producer task destined for a particular consumer task. The actual physical storage used by the streams 1003 to store the output of tasks can be located on one or more of the nodes, for example, at the local daemon for one or more nodes. If the node which is scheduled to execute a particular consumer task is known at the time of completion of a corresponding producer task, the stream data (producer task output) can be stored with the daemon for the node which is scheduled to execute the consumer task. Additionally, the producer task output can also be stored locally on the daemon for the node which executed the producer task, in association with the corresponding logical stream identifier and UUID. The producer task output can also be stored in persistent storage, as will be discussed further below.

As shown in FIG. 10, each of the streams in the set of streams 1003 stores the output of a producer task. Since each stream specifies the corresponding consumer task for each producer task, when execution of corresponding consumer task is detected on a particular node, the stream structure is used (by the orchestrator and/or Blaze engine) to automatically forward the contents of the appropriate stream to the node executing the corresponding consumer task. This allows each stream to map the output of producer task of the stream as input to a corresponding consumer task of the stream when the consumer task is executed. Since executors and nodes which execute tasks do need to be assigned until execution time, each stream can dynamically map the output of producer task of the stream as input to a node which is executing the corresponding consumer task of the stream when the node is assigned to the consumer task. Additionally, the output of producer tasks can be transmitted to nodes executing the corresponding consumer tasks via the stream API without being stored in persistent storage.

Figure 11:
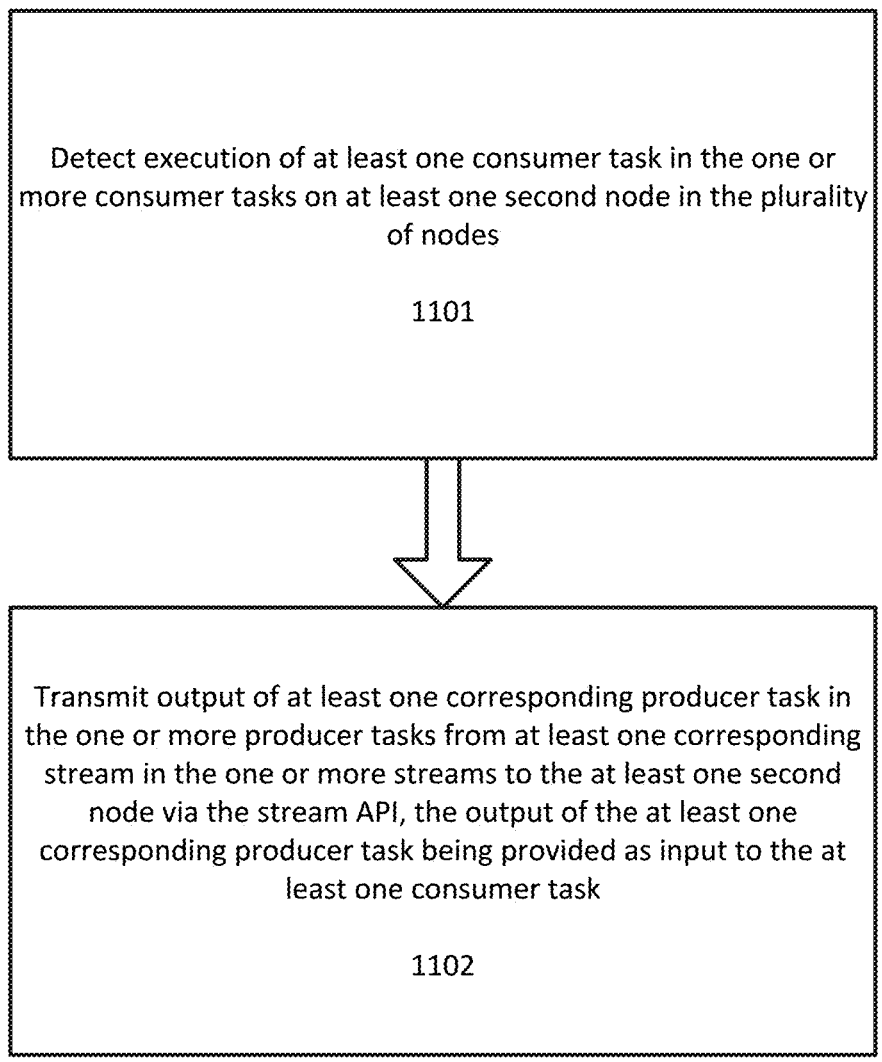
FIG. 11 illustrates a flowchart for transmitting output of a producer task to a node executing a consumer task according to an exemplary embodiment.

FIG. 11 illustrates a flowchart for transmitting output of a producer task to a node executing a consumer task according to an exemplary embodiment. At step 1101 execution of at least one consumer task in one or more consumer tasks is detected on at least one second node in the plurality of nodes of the execution environment. This step is explained further with reference to FIG. 12. At step 1102 of FIG. 11, output of at least one corresponding producer task in one or more producer tasks is transmitted from at least one corresponding stream in one or more streams to the at least one second node via the stream API. The output of the at least one corresponding producer task is provided as input to the at least one consumer task through the at least one second node which is executing the at least one consumer task.

Figure 12:
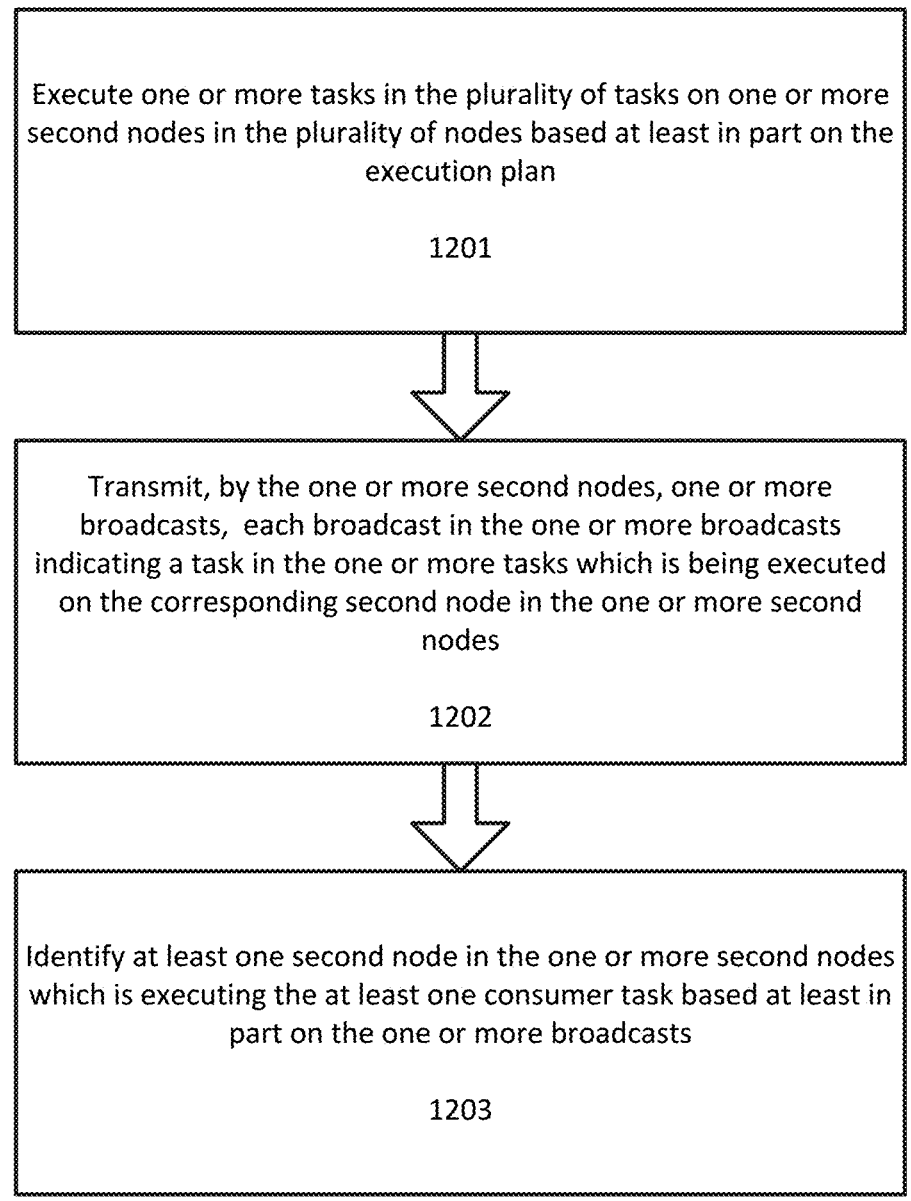
FIG. 12 illustrates a flowchart for detecting execution of at least one consumer task in one or more consumer tasks.

FIG. 12 illustrates a flowchart for detecting execution of at least one consumer task in one or more consumer tasks. At step 1201 one or more tasks in the plurality of tasks are executed on one or more second nodes in the plurality of nodes based at least in part on the execution plan. At step 1202 one or more broadcasts are transmitted by the one or more second nodes. Each broadcast in the one or more broadcasts indicates a task in the one or more tasks which is being executed on the corresponding second node in the one or more second nodes. Additionally, if multiple tasks are being executed at a particular node (for example, if the node has multiple executors executing multiple tasks), then the node can broadcast all of the tasks which are being executed at that node. At step 1203 at least one second node in the one or more second nodes which is executing the at least one consumer task is identified based at least in part on the one or more broadcasts.

The process for detecting execution of consumer tasks and forwarding output of corresponding producer tasks via the stream API according to an exemplary embodiment is illustrated in the example shown in FIGS. 13A-13D.

Box 1300 illustrates the state of execution after the execution of tasks A1-A5 as shown in FIGS. 9-10. The run queue 1300C includes tasks B1, B2, B3, B4, and C1. The runnable queue (tasks not yet scheduled for execution) 1300D includes tasks C2, C3, C4, and C5. Also shown are the first data exchange 1300A, the second data exchange 1300B, and the stream storage 1300E, which is illustrated as a logical table indicating each stream name and the corresponding stream contents. Of course, other logical constructs can be used to link the stored output of a particular producer task with a corresponding stream. For example, each stream can implemented as a pointer variable which points to the output of a corresponding producer task.

While many implementations are possible, the run queue 1300C and runnable queue 1300D can be stored on memory of the orchestrator component. Additionally, the first data exchange 1300A and the second data exchange 1300B can be stored at a component such as the orchestrator and/or distributed among the nodes and stored at local daemons. Furthermore, the stream storage 1300E can also be stored in memory at the orchestrator, among the nodes and daemons of the execution environment, and/or at other components of the Blaze engine.

Box 1301 illustrates the execution of tasks B1-B4 and C1 on nodes 1-4 of the execution environment. As shown in Box 1301, the output of tasks B1-B4 is written to a corresponding stream identified in data exchange 1300B having UUID=002. Similar to the execution of tasks A1-A5, the corresponding stream can be identified in a variety of manners. In this case, the UUID is used along with the target consumer task, since each local daemon at each node is aware of the (producer) task executing on each of its executors. Therefore, each local daemon can identify each stream using the UUID, the producer task (which is executing), and the consumer task which corresponds to the producer task.

For example, task B3 is executing on Node 3. The output stream is specified as UUID=002 and the consumer tasks are identified as C2 and C3. The local daemon can then transmit the output of this task to the stream API and indicate that it should be written to two streams: Stream 1 having UUID=002, producer task B3, and consumer task C2; and Stream 2 having UUID=002, producer task B3, and consumer task C3. The stream API can then provide this information to the orchestrator or other Blaze engine component which references the data exchange having UUID=002 and stores the output of task B3 in the appropriate streams. Alternatively, the local daemon can simply transmit the output of the task to the stream API along with an identifier of the task and the stream API can determine whether the task is a producer task (by consulting the data exchanges), and if so, determine which streams the output should be written to.

Figure 13A:
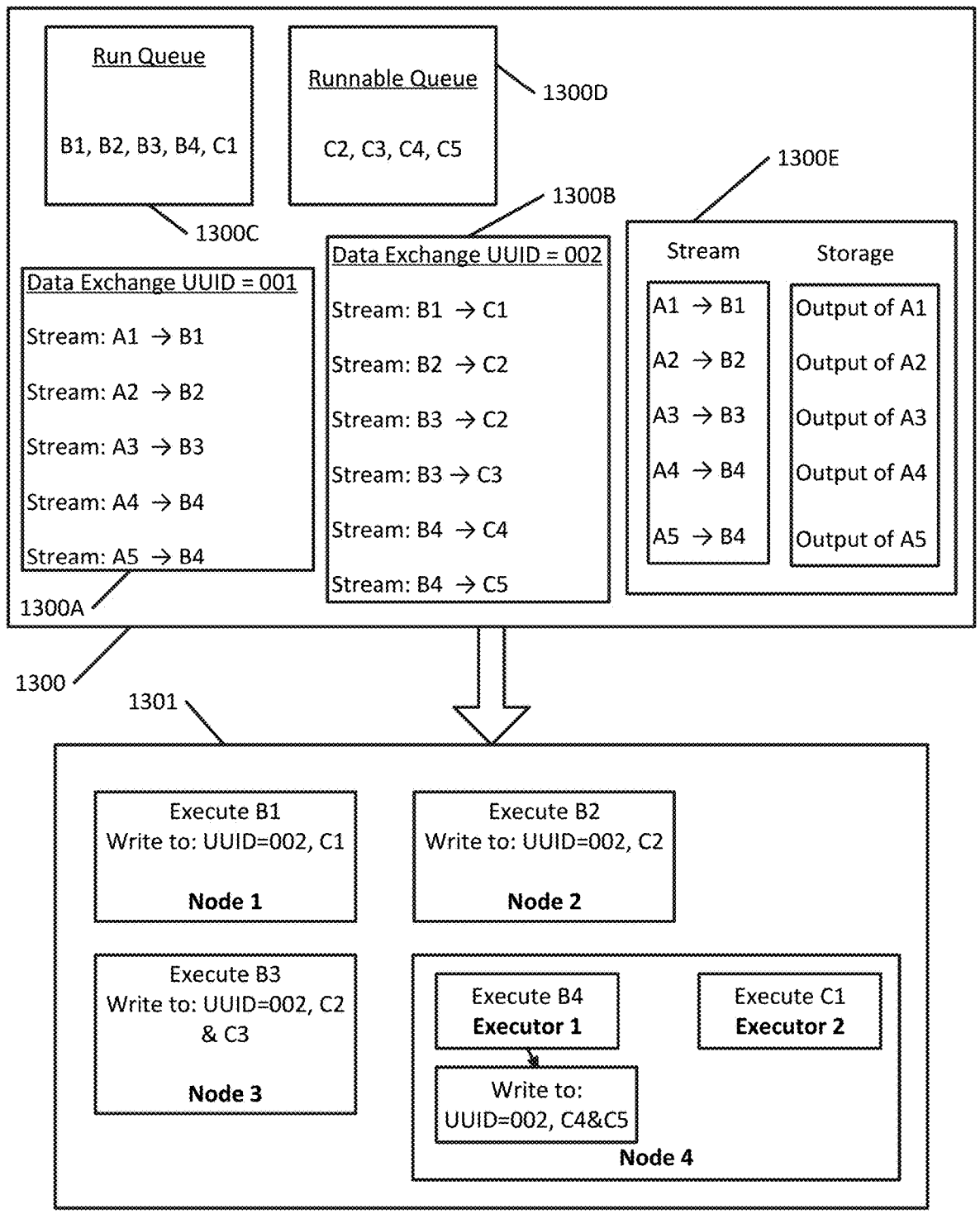
FIGS. 13A-13D illustrate the process for detecting execution of consumer tasks and forwarding output of corresponding producer tasks via the stream Application Programming Interface (API) according to an exemplary embodiment.

As shown in FIG. 13A, the output of task C1 is not written to any streams. This is because task C1 is not a producer task in any data exchanges which are part of the execution plan. For example, task C1 could be a final output of the execution plan. The local daemon can determine which tasks are producer tasks by querying the stream API, which can return information regarding which streams (if any) the output of a task should be written to. Alternatively, the local daemon can simply transmit the output of the task to the stream API along with an identifier of the task and the stream API can determine that the task is not a producer task (by consulting the data exchanges), and therefore not write the output to any streams. The output task C1 can be written elsewhere, such as to a storage or file which stores the final output of the execution plan.

Figure 13B:
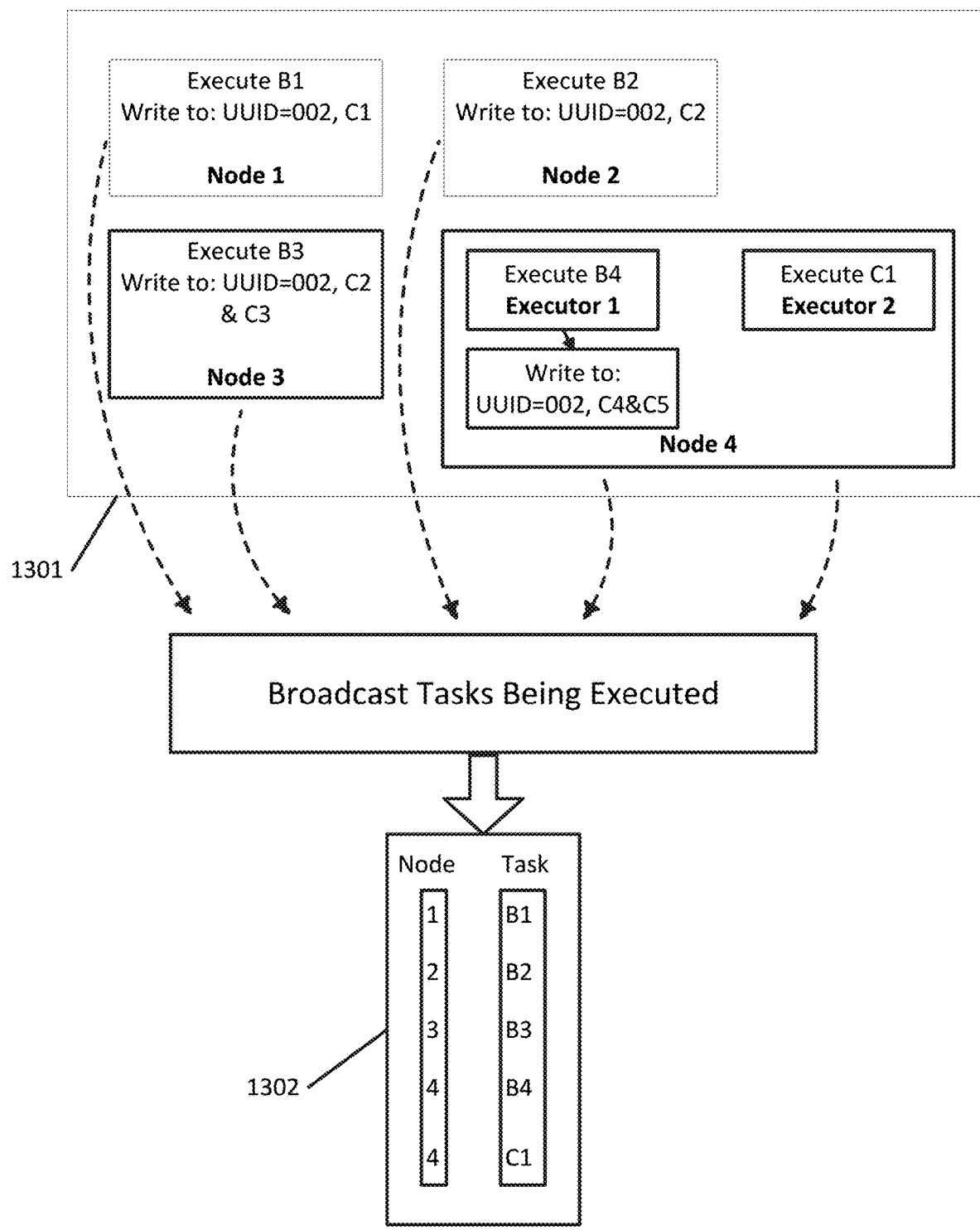

FIG. 13B illustrates the broadcasting of tasks being executed by each of the nodes in the execution environment according to an exemplary embodiment. As shown in FIG. 13B, each of the nodes in the execution environment 1301 broadcasts the tasks which are executing at that node. This broadcast can be transmitted by each of the local daemons at each of the nodes. The broadcast information can then be consolidated, such as in table 1302, which lists each node and the task which is executing at that node. As shown in table 1302, each of nodes 1-3 is executing a single task and node 4 is executing both tasks B4 and C1. Table 1302 can be accessed by the orchestrator, other components of the Blaze engine, and/or the stream API.

Figure 13C:
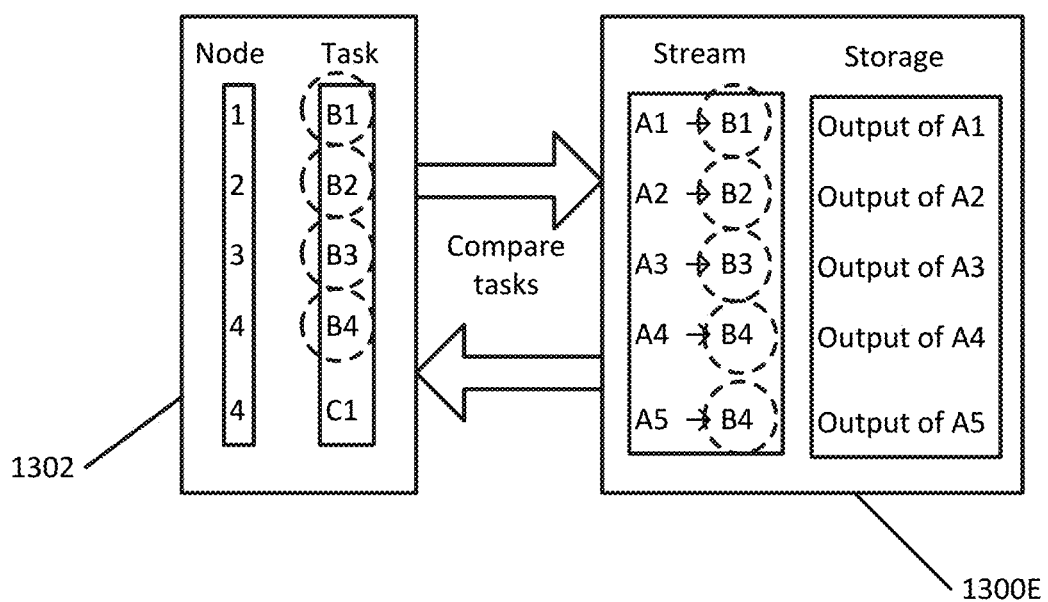

FIG. 13C illustrates the identification of consumer tasks based on the table 1302 of currently executing tasks and the stream storage 1300E according to an exemplary embodiment. Each of the consumer tasks in each of the streams in stream storage 1300E can be compared to each of the currently executing tasks in the table 1302. The matching tasks are shown with dashed circles. This comparison can be performed by the orchestrator and/or by logic implemented as part of the stream API.

Figure 13D:
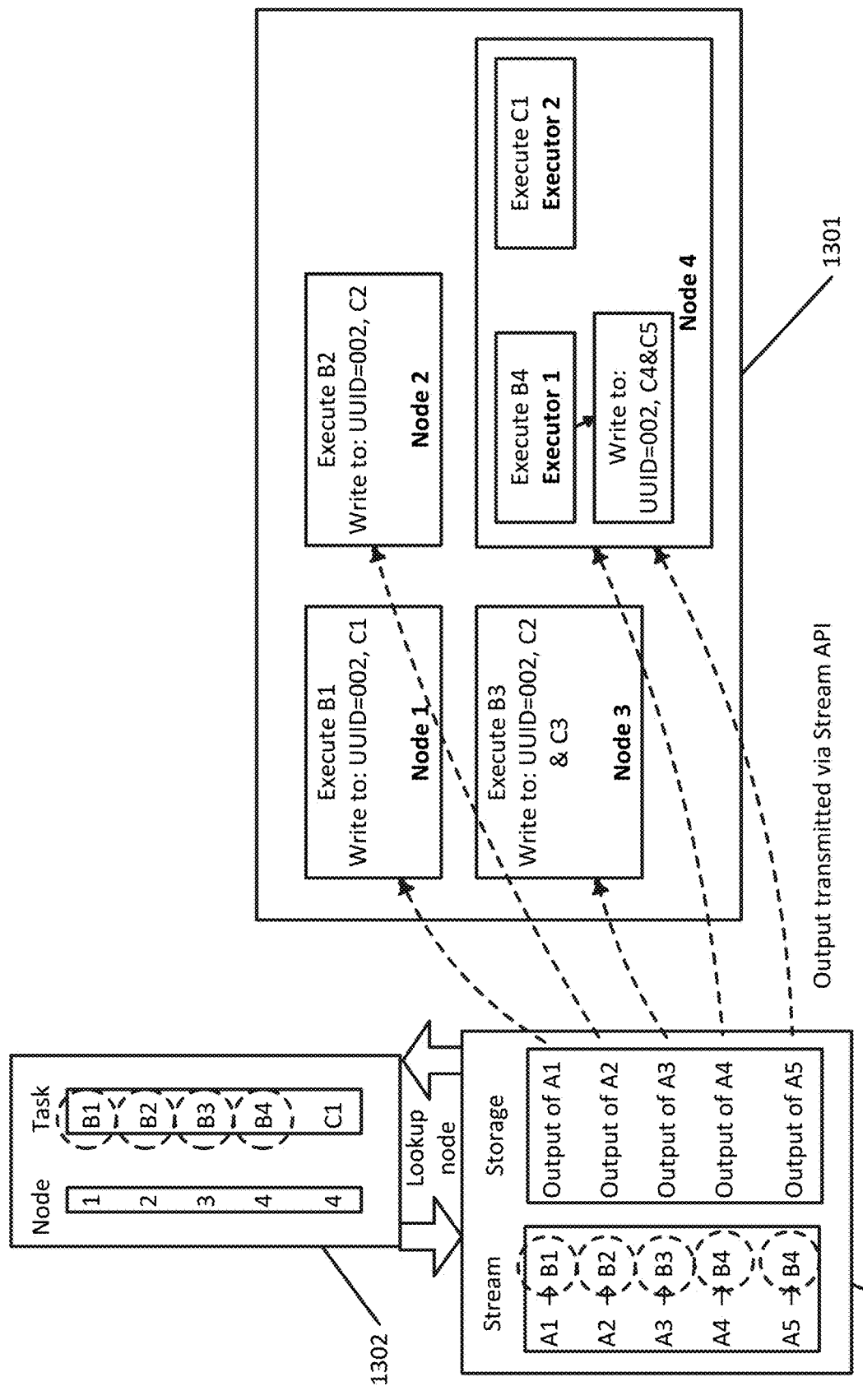

FIG. 13D illustrates the forwarding of output from producer tasks to corresponding consumer tasks via the stream API according to an exemplary embodiment. As shown in FIG. 13D, the matching tasks in the stream storage 1300E can be cross-referenced with the table of currently executing tasks 1302 to identify which nodes to transmit information to. For example, task B1 in the stream storage 1300E has been identified as a task which is currently executing. The currently executing tasks 1302 table can then be referenced to identify that task B1 is executing on node 1. The producer task output stored in stream A1→B1 can then be transmitted to node 1 in execution environment 1301 via the stream API, as shown in FIG. 13D. Similarly, the output of other producer tasks which is stored in the other streams can be transmitted to the appropriate nodes in the execution environment 1301. The transmitted producer task output is received at each respective node and routed from the local daemon to the executor which is executing the corresponding consumer task. The identification of nodes which are executing consumer tasks and the routing of producer task output stored in each stream to the appropriate nodes, as described with reference to FIGS. 13A-13D, can be implemented as logic which is part of the stream API and executed by the Blaze engine.

In certain situations, it can be beneficial to write the output of a particular producer task from the stream storage to persistent storage prior to providing the output to the corresponding consumer task. For example, in situations where there are a large number of tasks and/or high recoverability is desired in the event of a failure, it may be desirable to write output from stream storage to persistent storage.

Figure 14:
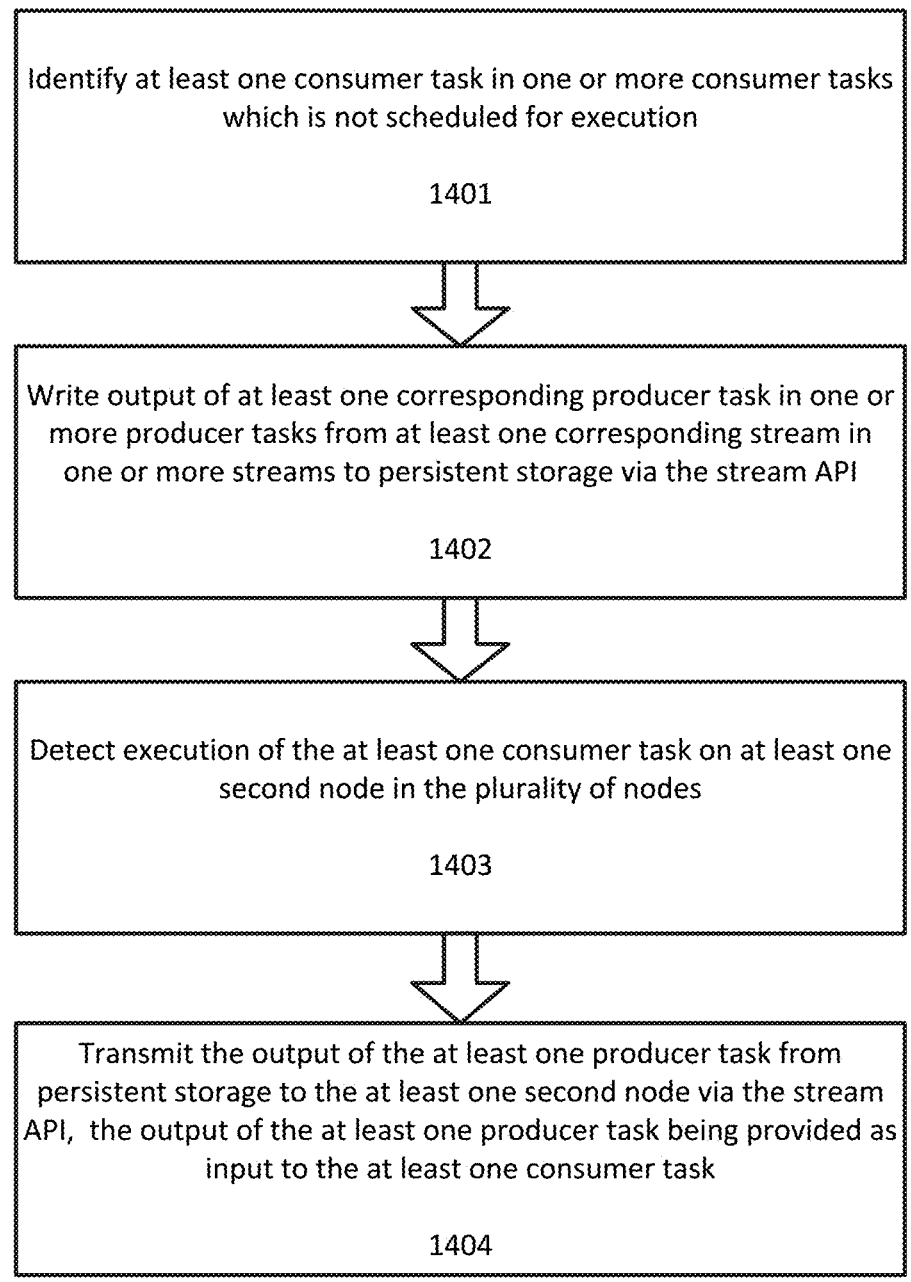
FIG. 14 illustrates a flowchart for writing the output of a producer task to persistent storage prior to providing the output to a consumer task according to an exemplary embodiment.

FIG. 14 illustrates a flowchart for writing the output of a producer task to persistent storage prior to providing the output to a consumer task according to an exemplary embodiment. At step 1401 at least one consumer task in the one or more consumer tasks which is not scheduled for execution is identified. For example, the stream API identify one or more consumer tasks which are in the runnable queue and which are not scheduled for execution and which are not currently executing. At step 1402 the output of at least one corresponding producer task in the one or more producer tasks is written from at least one corresponding stream in the one or more streams to persistent storage via the stream API. At step 1403 execution of the at least one consumer task on at least one second node in the plurality of nodes is detected. This detection can be similar to that shown in FIGS. 13A-13D. At step 1404 the output of the at least one producer task is transmitted from persistent storage to the at least one second node via the stream API and is provided as input to the at least one consumer task.

Figure 15:
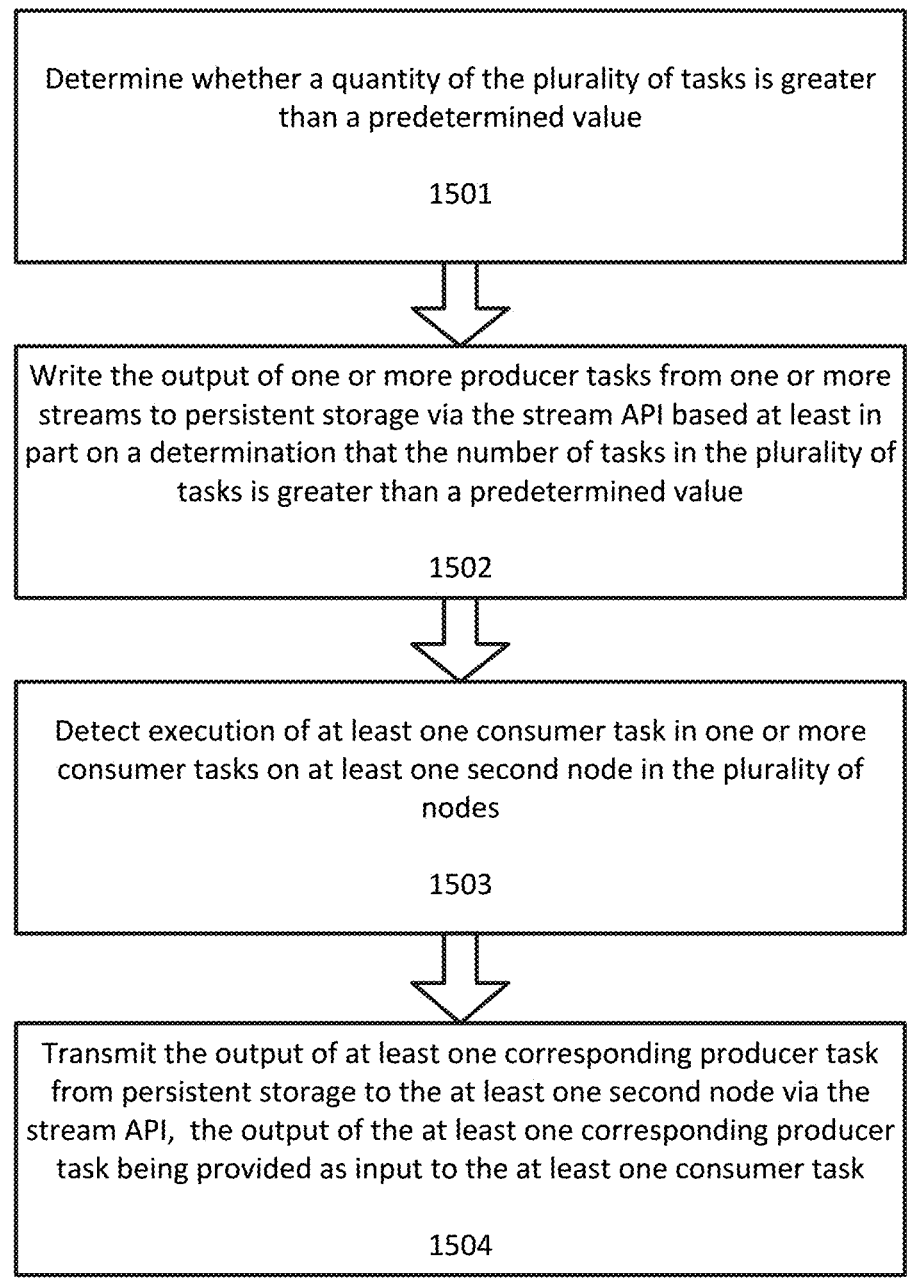
FIG. 15 illustrates another flowchart for writing the output of a producer task to persistent storage prior to providing the output to a consumer task according to an exemplary embodiment.

FIG. 15 illustrates another flowchart for writing the output of a producer task to persistent storage prior to providing the output to a consumer task according to an exemplary embodiment. At step 1501 it is determined whether a quantity of the plurality of tasks is greater than a predetermined value. In other words, whether the total number of tasks in the execution plan is greater than some minimum threshold, which can be set by the Blaze engine and/or by a user. This step can be utilized to automatically require persistent storage for jobs which have a minimum number of total tasks. At step 1502 the output of one or more producer tasks is written from one or more streams to persistent storage via the stream API based at least in part on a determination that the quantity of the plurality of tasks is greater than the predetermined value. At step 1503 execution of the at least one consumer task in one or more consumer tasks on at least one second node in the plurality of nodes is detected. This detection can be similar to that shown in FIGS. 13A-13D. At step 1404 the output of at least one corresponding producer task is transmitted from persistent storage to the at least one second node via the stream API and is provided as input to the at least one consumer task.

Of course, the methods described in FIGS. 14-15 can be combined. For example, a determination can be made regarding whether a quantity of total tasks is greater than some predetermined value and whether at least one consumer task in one or more consumer tasks is not scheduled for execution. If the quantity of total tasks is greater than the predetermined value and at least one consumer task is not scheduled for execution, then the output from at least corresponding producer task can be written from stream storage to persistent storage and retrieved when execution of the at least one consumer task is detected. Additionally, the decision of whether to store output of tasks on persistent storage can be based on some predetermined threshold, predetermined set of tasks (the job size or job type), resources available, computation times, and/or any other measure.

Figure 16:
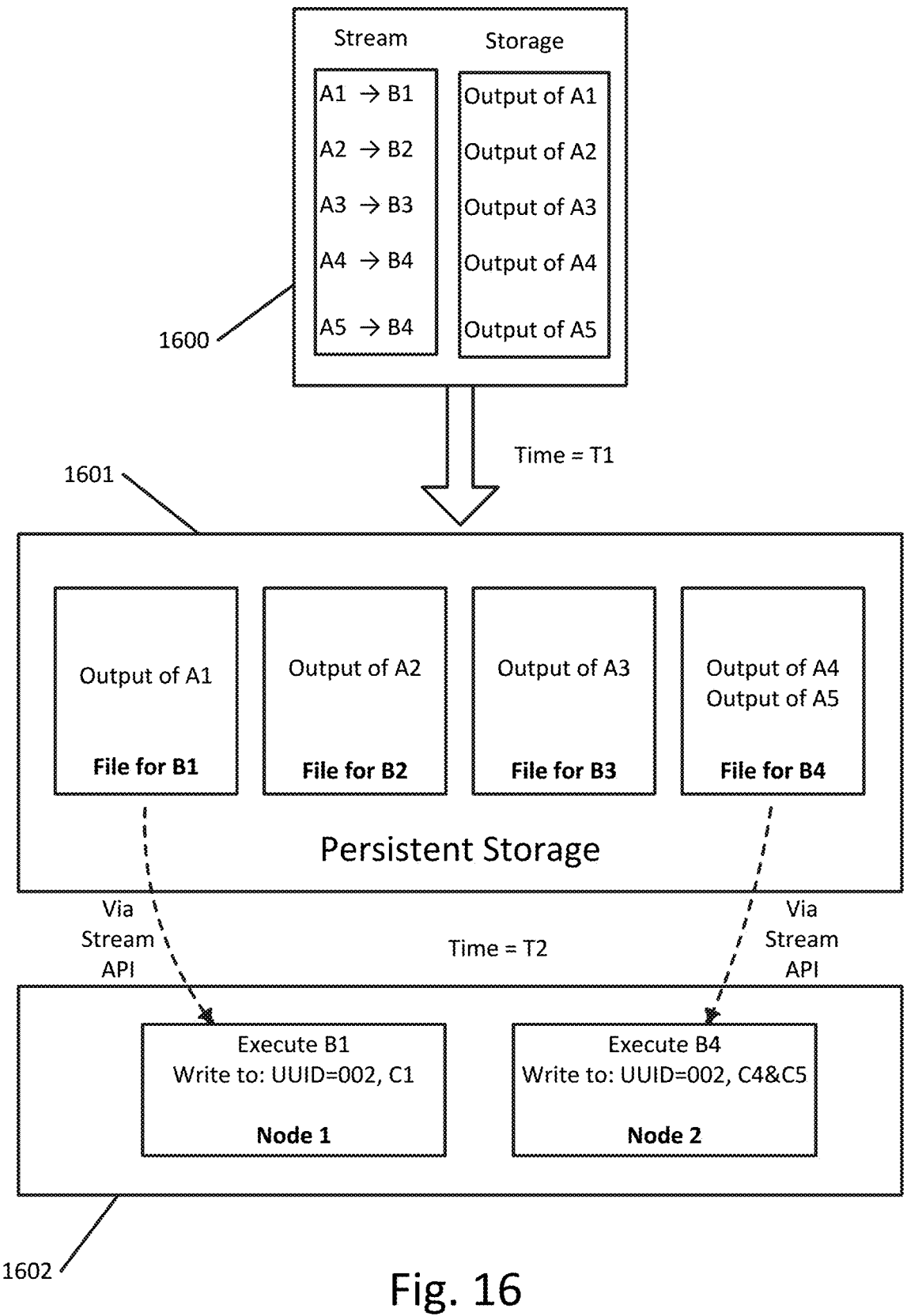
FIG. 16 illustrates an example utilizing persistent storage according to an exemplary embodiment.

FIG. 16 illustrates an example utilizing persistent storage according to an exemplary embodiment. Stream storage 1600 indicates the output of producer tasks stored in each of the streams of a set of streams. At time t1 the outputs are written to persistent storage 1601. As shown in FIG. 16, the outputs can be grouped into separate files organized by consumer task. For example, the output of task A4 and the output of task A5 are grouped into a single file, since both task A4 and task A5 have task B4 as a consumer task. At time t2 execution of tasks B1 and B4 are detected. Consequently, the output of task A1 is provided to Node 1 which is executing task B1 in execution environment 1602. Additionally, the output of tasks A4 and A5 are provided to Node 2 which is executing task B4 in execution environment 1602. The outputs can be retrieved from the files in the persistent storage by the stream API and transmitted to the appropriate nodes which are executing the detected consumer tasks.

Figure 17:
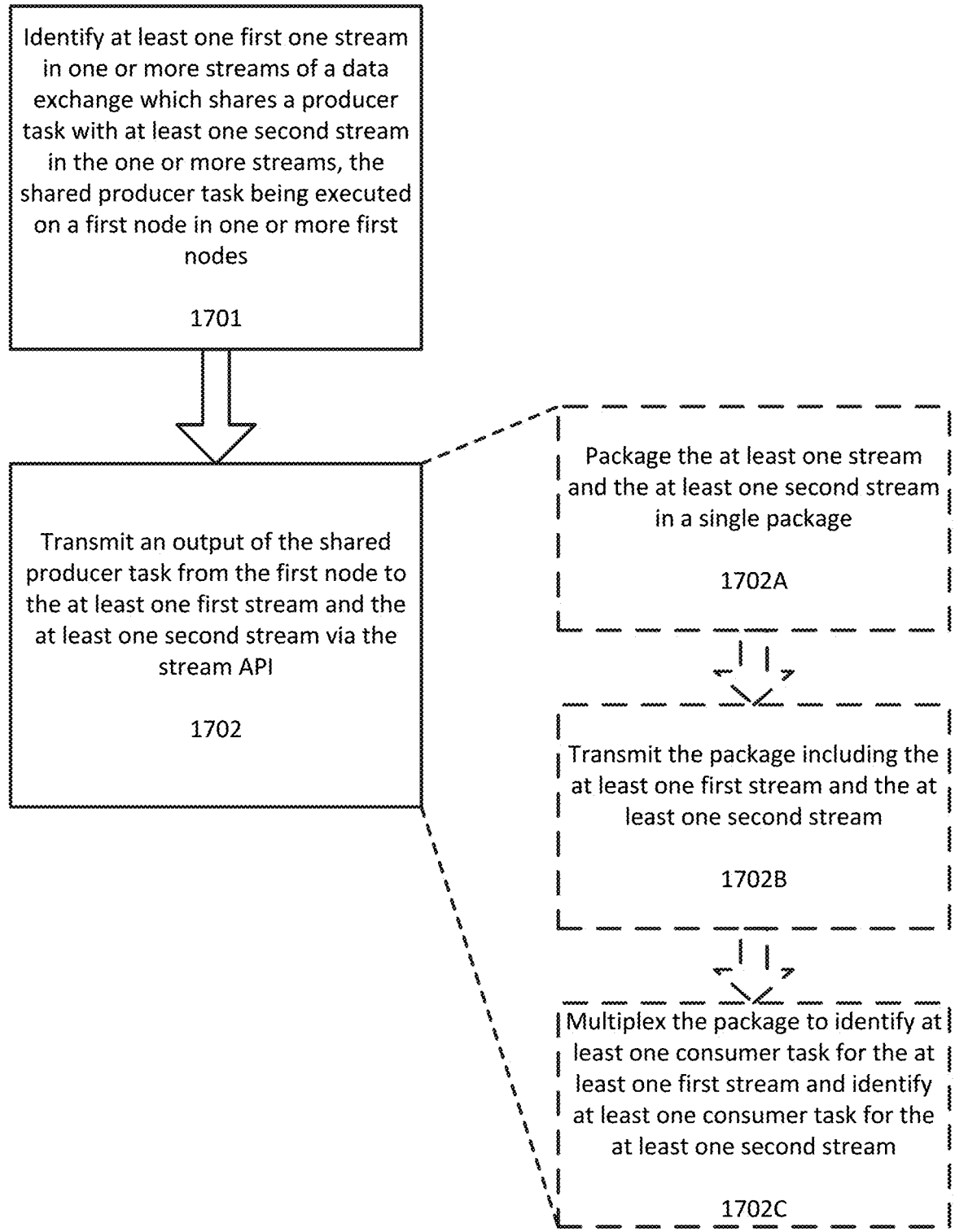
FIG. 17 illustrates a flowchart for transmitting output from a node to multiple streams according to an exemplary embodiment.

FIG. 17 illustrates a flowchart for transmitting output from a node to multiple streams according to an exemplary embodiment. At step 1701 at least one first one stream in one or more streams of a data exchange which shares a producer task with at least one second stream in the one or more streams is identified, the shared producer task being executed on a first node in one or more first nodes. At step 1702 an output of the shared producer task is transmitted from the first node to the at least one first stream and the at least one second stream via the stream API. As discussed earlier, each of the at least one first stream and the at least one second stream are configured to map the output of the producer task to a corresponding consumer task.

Figure 18:
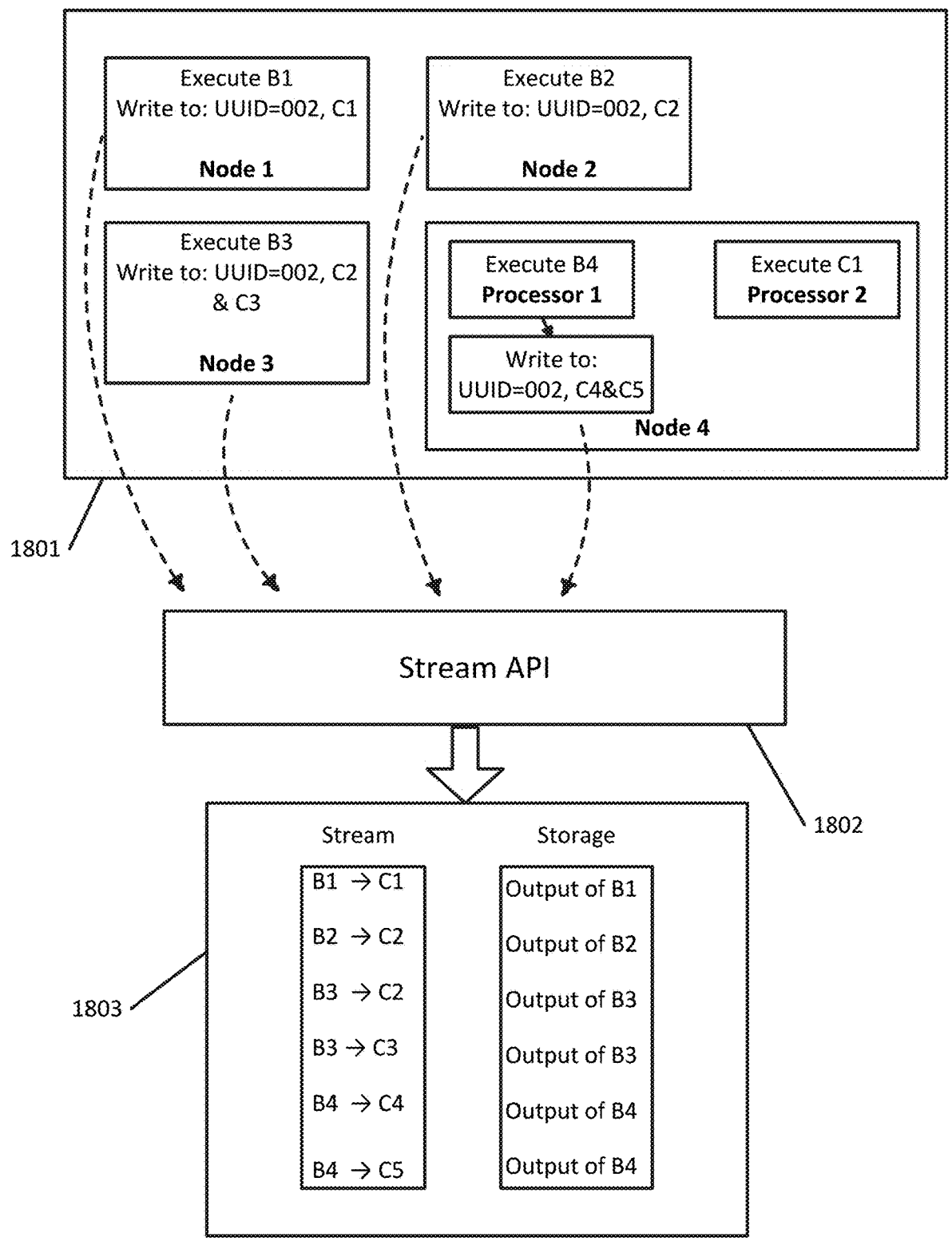
FIG. 18 illustrates an example of transmitting output from a node to multiple streams according to an exemplary embodiment.

FIG. 18 illustrates an example of transmitting output from a node to multiple streams according to an exemplary embodiment. As shown in execution environment 1801, tasks B1-B4 and C1 are executing on nodes 1-4. The output of each of the tasks is transmitted, via the stream API, to the corresponding streams. As indicated in stream storage 1803, this results in several outputs being transmitted to more than one stream. For example, the output of task B3 executing on node 3 is transmitted to streams B3→C2 and B3→C3 and the output of task B4 executing on processor 1 of node 4 is transmitted to streams B4→C4 and B4→C5.

Returning to FIG. 17, the process of transmitting an output of the shared producer task from the first node to the at least one first stream and the at least one second stream via the stream API can optionally include steps 1702A-1702C. At step 1702A the at least one stream and the at least one second stream are packaged in a single package. At step 1702B the package including the at least one first stream and the at least one second stream is transmitted. At step 1702C the package is multiplexed to identify at least one consumer task for the at least one first stream and identify at least one consumer task for the at least one second stream. Steps 1702A-1702C allow for efficient transmission of output from a node to multiple streams, as multiple transmissions do not need to be sent for multiple streams.

Figure 19:
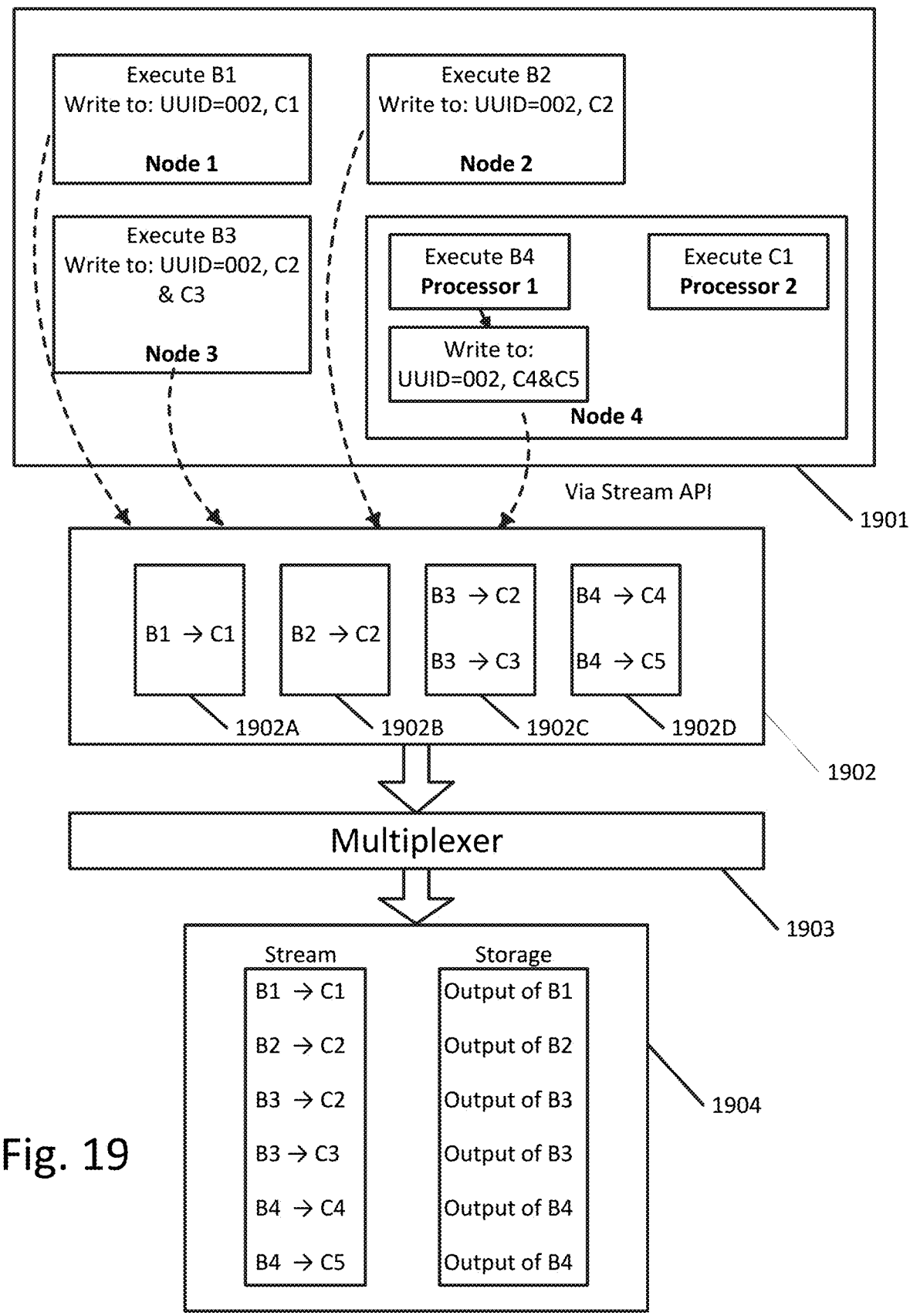
FIG. 19 illustrates the packaging and multiplexing of multiple streams from a single node according to an exemplary embodiment.

FIG. 19 illustrates the packaging and multiplexing of multiple streams from a single node according to an exemplary embodiment. Similar to FIG. 18, tasks B1-B4 and C1 are executing on nodes 1-4 in execution environment 1901. The output of the producer tasks is then written to the appropriate streams and packaged according to producer task. Box 1902 illustrates the packages generated. Package 1902A includes stream B1→C1, package 1902B includes stream B2→C2, package 1902C includes streams B3→C2 and B3→C3, and package 1902D includes streams B4→C4 and B4→C5. The packages 1902 are then passed through a multiplexer 1903 which maps the output of each producer task to the appropriate streams, resulting in stream storage 1904.

Figure 20:
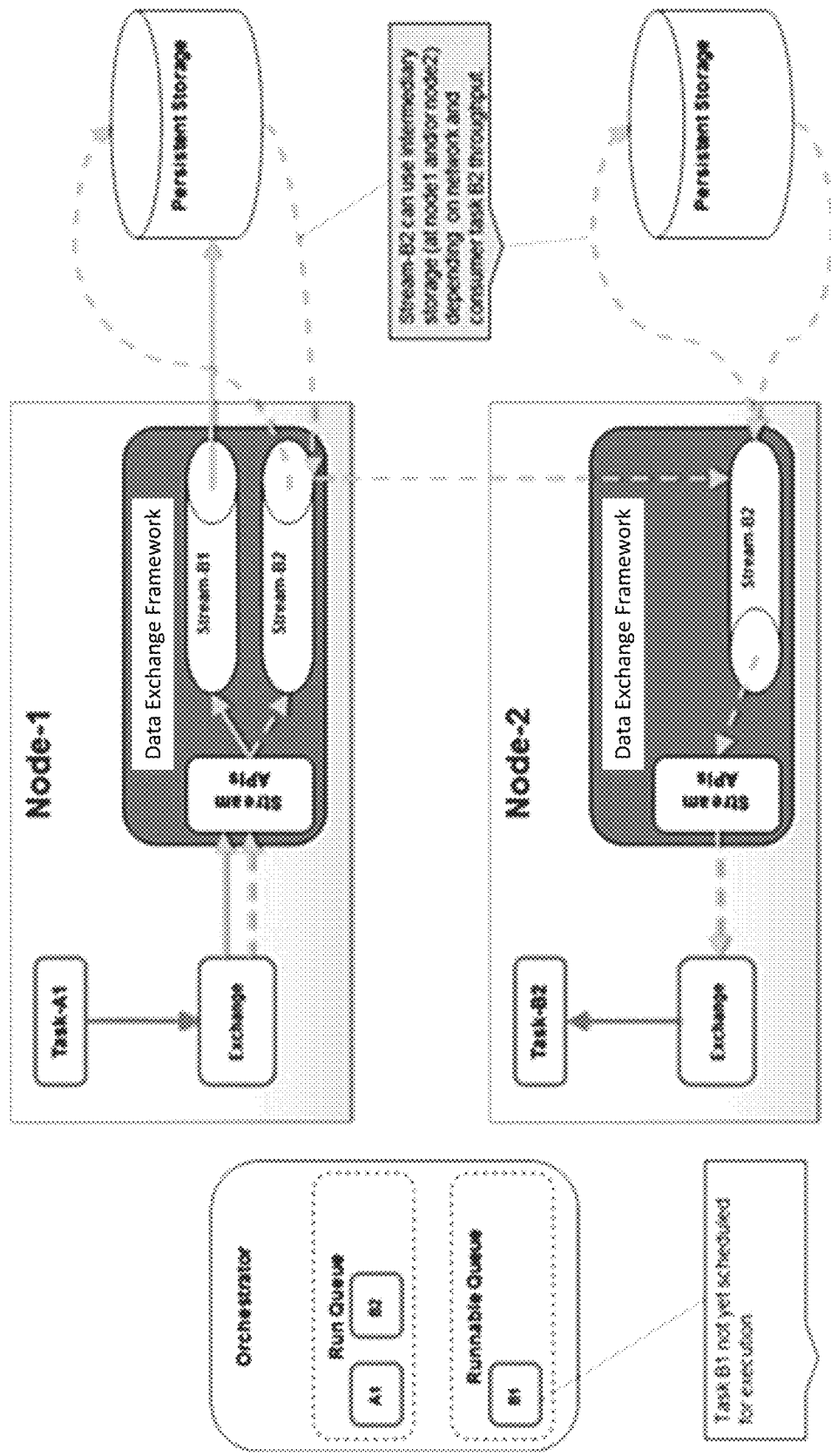
FIG. 20 illustrates an example of processing tasks without high availability performed by the Blaze engine according to an exemplary embodiment.

FIG. 20 illustrates an example of processing performed by the Blaze engine. FIG. 20 shows the Blaze Engine processing tasks without high availability (HA), meaning no recovery in the event of a crash or failure. Since the system of FIG. 20 is not designed for recovery, there are no costs for persisting data on disk, as is explained further below.

The orchestrator of the Blaze engine receives requests to execute multiple tasks. The orchestrator will also request resources from the OS, such as YARN (Yet Another Resource Negotiator), which is a large-scale, distributed operating system for big data applications. As shown in FIG. 20 and discussed earlier, the orchestrator can separate tasks into tasks which are executable at the moment (the run queue) and into tasks which are not yet able to be executed (the runnable queue) and which are waiting. This assessment can be based on available resources.

Referring to FIG. 20, A1 is a producer task and B1 and B2 are two consumer tasks which take the output of A1 as input. As shown in the figure, A1 and B2 are both currently executing (on nodes Node-1 and Node-2 respectively). Additionally, B1 is still not running.

Task A1 communicates with the Blaze DEF during execution using the stream APIs to communicate that it is writing to streams B1 and B2. As discussed earlier, these streams are designated as part of the shuffle and could be represented as A1→B1 and A1→B2. However, A1 is unaware of the statuses of B1 and B2. No individual task is aware of the status of any of the other tasks.

The data exchange framework detects that task B2 is running at the same time, and rather than writing the output of task A1 to disk for later reading by task B2, the data output generated task A1 will automatically be forwarded to Node-2, which will rely the information to task B2 which is executing on Node-2. As discussed earlier, this process will involve Node-1 communicating with its local daemon, which itself will communicate with the local daemon for Node-2, which will transmit the data to Node-2 and then to the executor which is executing task B2.

Additionally, the DEF will detect that task B1 is not yet executing. Therefore, the output of task A1 will be written to persistent storage, so that when task B1 is executed, the data can be read from persistent storage and used for task B1 (by whichever executor and node ends up executing task B1). This writing is not performed for recovery purposes; rather it is performed because B1 is not yet running.

The detection of whether a particular task is running is performed by the DEF. As discussed earlier, the Blaze infrastructure requires nodes to broadcast when they are executing particular tasks. These broadcasts are picked up a data exchange daemon or by the local daemon for that node. The daemons can then communicate this information with each other using their own protocol and/or share the information with the orchestrator so that the DEF is aware of the status of each task (already executed, currently executing, yet-to-be-executed).

Figure 21:
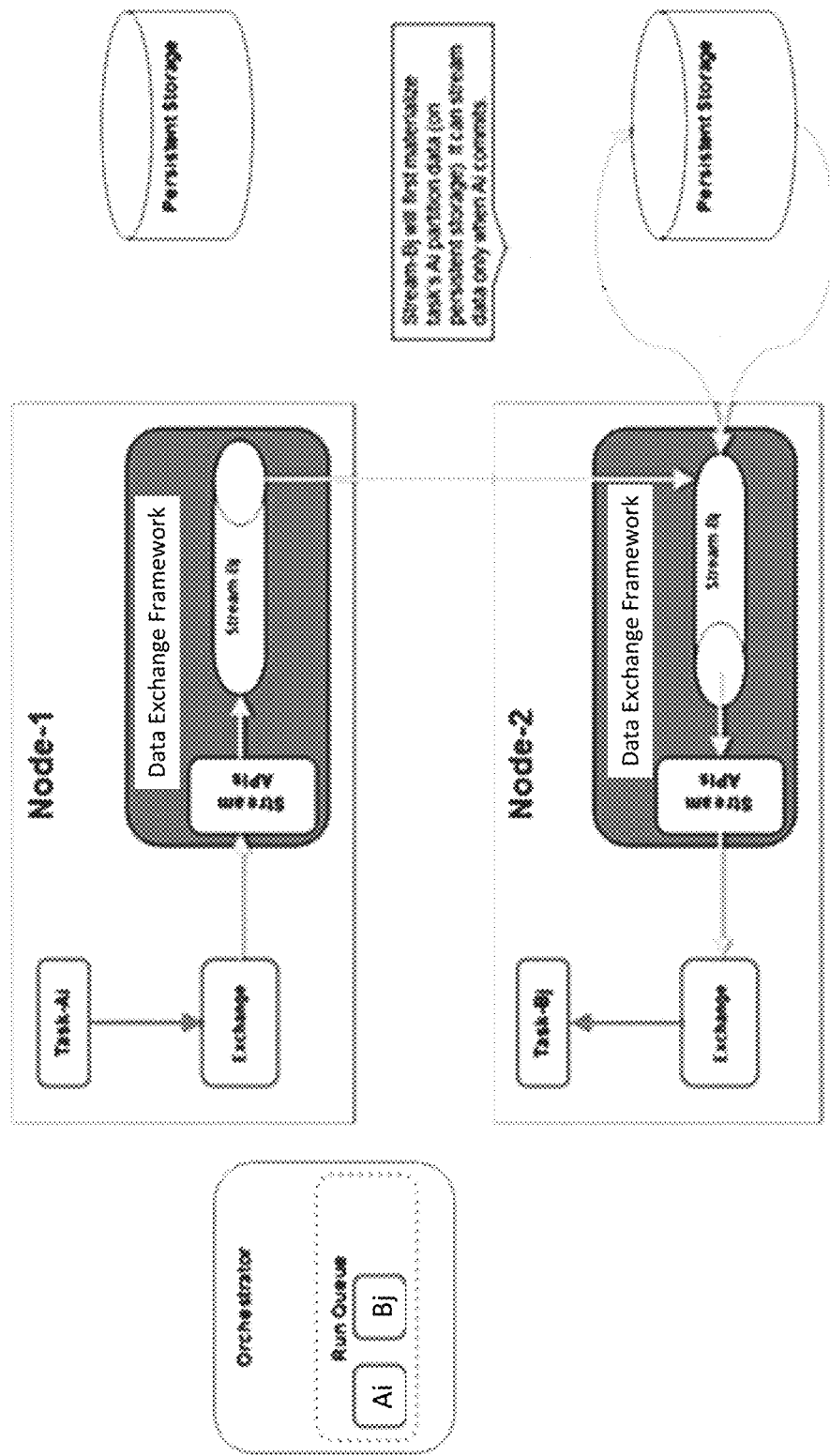
FIG. 21 illustrates processing performed by the Blaze engine when there is high availability according to an exemplary embodiment.

FIG. 21 illustrates processing performed by the Blaze engine when there is high availability (HA) which is used when the system is meant to be recoverable. HA is utilized when a set of tasks (the job) is large enough that it would be inefficient to being the process of executing all tasks from the start in the event of a failure. For smaller sets of tasks, the no-HA system of FIG. 20 could be utilized in order to increase processing speed. The determination of whether the processing will be HA or no-HA can be made by the Blaze DEF compiler based on some predetermined threshold, predetermined set of tasks (the job size), resources available, computation times, and/or any other measure. As shown in FIG. 21, under high availability, whenever a producer task produces data, that data is persisted on the disk. This data is then provided to the consumer task when it executes.

Figure 22:
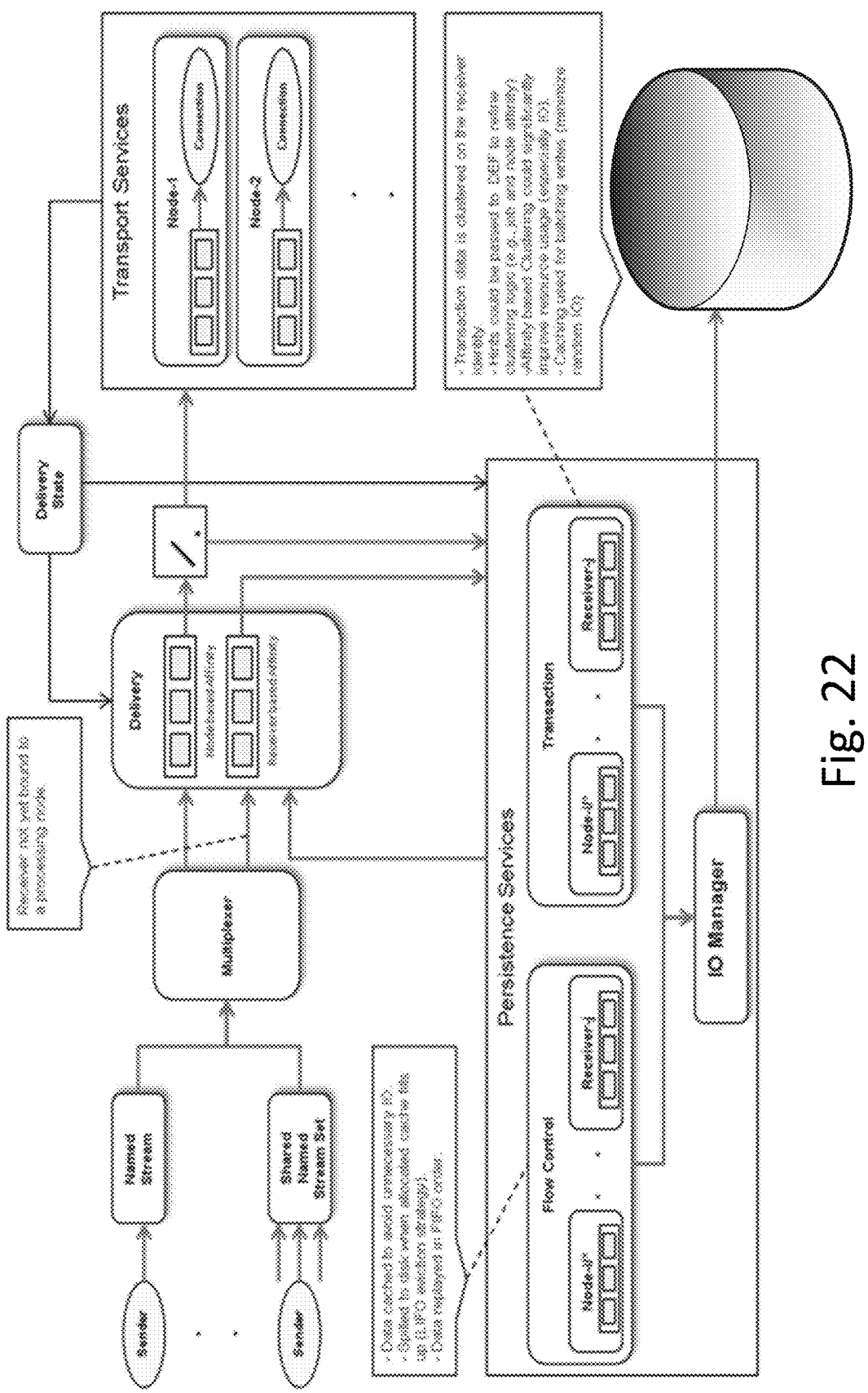
FIG. 22 illustrates an overview of the internal structure of the Blaze DEF according to an exemplary embodiment.

FIG. 22 illustrates an overview of the internal structure of the Blaze DEF according to an exemplary embodiment. As shown in FIG. 22, when a particular sender (producer) has a large number of streams (output consumers), the streams can be consolidated prior to sending to a multiplexer which will send each of the streams to the appropriate local DEF daemon and onto the appropriate consumers.

Note that the output of the multiplexer does not necessarily have to designate a particular node or daemon, but rather a stream which indicates consumer task. Since the task may not have yet been executed or scheduled, there may be situations when the particular node is not yet known. However, when the consumer task is read and then executed, it binds to a particular executor and node and this information is broadcast by the local daemon, as discussed earlier.

The delivery agent can handle the situation when the consumer task is already running and can route the data to the appropriate daemon, node, and executor via the transport services. If the consumer is not running, then the delivery agent can send the data to the disk via the persistence services or store the data at a daemon on a producer node.

Node based affinity refers to a queue for situations where the node for a particular consumer task is already known (the consumer task is executing). Receiver based affinity refers to a queue for a certain consumer tasks which have not yet been assigned to a particular node. When recovery is enabled (HA), then the data can be sent to both transport services and persistence services.

As discussed earlier, the handling for small data exchange jobs and large data exchange jobs can vary. In small data exchange jobs, Hadoop worker nodes can be setup with a small swapiness value. This means the DEF daemon can be allocated more memory (for a more targeted caching). A centralized cache is usually more efficient than multiple ones (e.g., Spark and Tez). Blaze uses a Full Restart strategy for small jobs to handle transient failures. The determination of whether a job is small can be made with regard to cluster resources. Streams are interleaved (no shuffle sorting). DEF will store intermediary data in memory till it is consumed or evicted because of memory pressure.

In small data exchange jobs, data can real-time streamed to consumer daemons. Additionally, DEF clients use a large receive window, which is expressed in terms of records (unit of data exchange) allotted from a shared client cache. Consumer daemons adapt the receive window based on the number of producer daemons. New requests are made when the number of undelivered records reaches a dynamic threshold, which is adjusted based on depletion rate.

For large data exchange jobs, a number of optimizations can be made which increase efficiency and reduce the time for recovery in the event of a failure. These optimizations include:

Decreasing the Number of Intermediary Files. In practice, producers and consumers do not run concurrently. Each DEF daemon creates one single file per consumer (One consumer file per node). The total number of intermediary files is N×R. N is the total number of nodes where the job is executing. For example, for a cluster with 1,000 nodes and 1,000,000 consumer partitions, the number of intermediary files per data node is 1,000,000. Only committed data is forwarded. Each record contains header information about the producer and attempt identifiers.

Utilizing Data Pre-fetch—The Orchestrator can learn worker node past task execution performance based on historical scheduling for the same task types. This allows it to pre-allocate where consumer tasks are to be executed (upfront). Consumer daemons can automatically pre-fetch data from consumer daemons. The total number of intermediary files is R. For example, for a cluster with 1,000 nodes and 1,000,000 consumer partitions, the number of intermediary files per data node is 1,000.

Modifying Data Pre-fetch based on Network Settings—If the network is slow, producer daemons might spill to disk. Therefore, intermediary data can be written to node files. The total number of intermediary files is R+N*2. For example, for a cluster with 1,000 nodes and 1,000,000 consumer partitions, the number of intermediary files per data node is 2,000.

Compression. Blaze DEF supports transport and IO based compression. Transport compression can be used for daemon to daemon communication based on the network speed (which can be detected at startup). IO compression can also be utilized.

Large Disk IO. The Storage Manager can elect storage pools which will result in IO that are a multiple of the DEF record. Usually, at least 1 MB. This highly minimizes the cost of seeking when reading from another file.

Dynamic Partitioning—Blaze DEF can dynamically adjust an exchange partition size based on its input and cluster resources. Smaller jobs will utilize a lower partition size. Larger jobs will utilize a larger partition size. Sampling is used to compute intermediary processing steps number of partitions. This logic improves the data exchange performance without sacrificing the overall job performance.

The methods, apparatuses, and computer-readable media described herein provide a number of benefits, including improvements to computing devices and improvements to the technical task of performing a data exchange. These benefits include:

Optimal Resource Utilization—The DEF Daemon uses memory to optimize IO. It is usually more effective to provision one large in-memory cache instead of many smaller ones. The reason for this is fragmentation. For example, assume N processors each with 1 GB of in-memory cache. Processor-i might require 2 GB of cache to avoid disk spill while the other processors are underutilized.

Private Vs OS Buffer Cache—The operating system buffer cache also uses memory to optimize IO. Additionally, a private memory cache can still be utilized for small jobs where pipelining is more suited.

Disk IO Optimization—A centralized data exchange process (per node) has the ability to make multiplexing more effective. In particular, all data destined to a target node (across consumers) can be written to the same disk file; this has the advantage of more sequential IO (while writing and reading) and the use of large IO (even when compression is used). Additionally, per consumer IO multiplexing can take place when the consumer is not bound and pre-fetching is turned off. This is a significant improvement over one file per Producer/Consumer in systems such as MapReduce.

Partial Vs Full Recovery—The Blaze DEF supports two strategies for fault handling. The full restart strategy is used for small to medium jobs and stores all exchange data in-memory (pipelining). A fault is handled by a full restart of the distributed task. Since the job size is minimal, this strategy is quite effective since processing time (and the probability of a fault) is fairly small. Additionally, the Blaze DEF supports a partial restart strategy for large jobs. In a partial restart, N copies of the exchange data are maintained to handle crashes (quorum). By default N can be set to 1 (and can be dynamically set based on the cluster size, data size, job priority, etc). This copy can be kept at the consumer node when the consumer is bound or pre-fetch is enabled.

Flow Control based Storage—In general the "Full Restart" strategy does not involve any disk spill except when a node is slow at receiving data or a consumer is not scheduled (such as when a cluster is overloaded).

Encapsulation & Fault Tolerance—The Blaze DEF is easier to manage and enhance as the overall logic is independent of the batch executor. The system is also more fault tolerant as the exchange logic is executing within a stand-alone service (this allows for C-based processors where the chance of crashes is higher).

Data Pre-fetch—The Orchestrator component can use historical information to pre-schedule consumer tasks (when they cannot be immediately executed) and pre-fetch the necessary output from producer tasks, improving processing time and efficiency.

Figure 23:
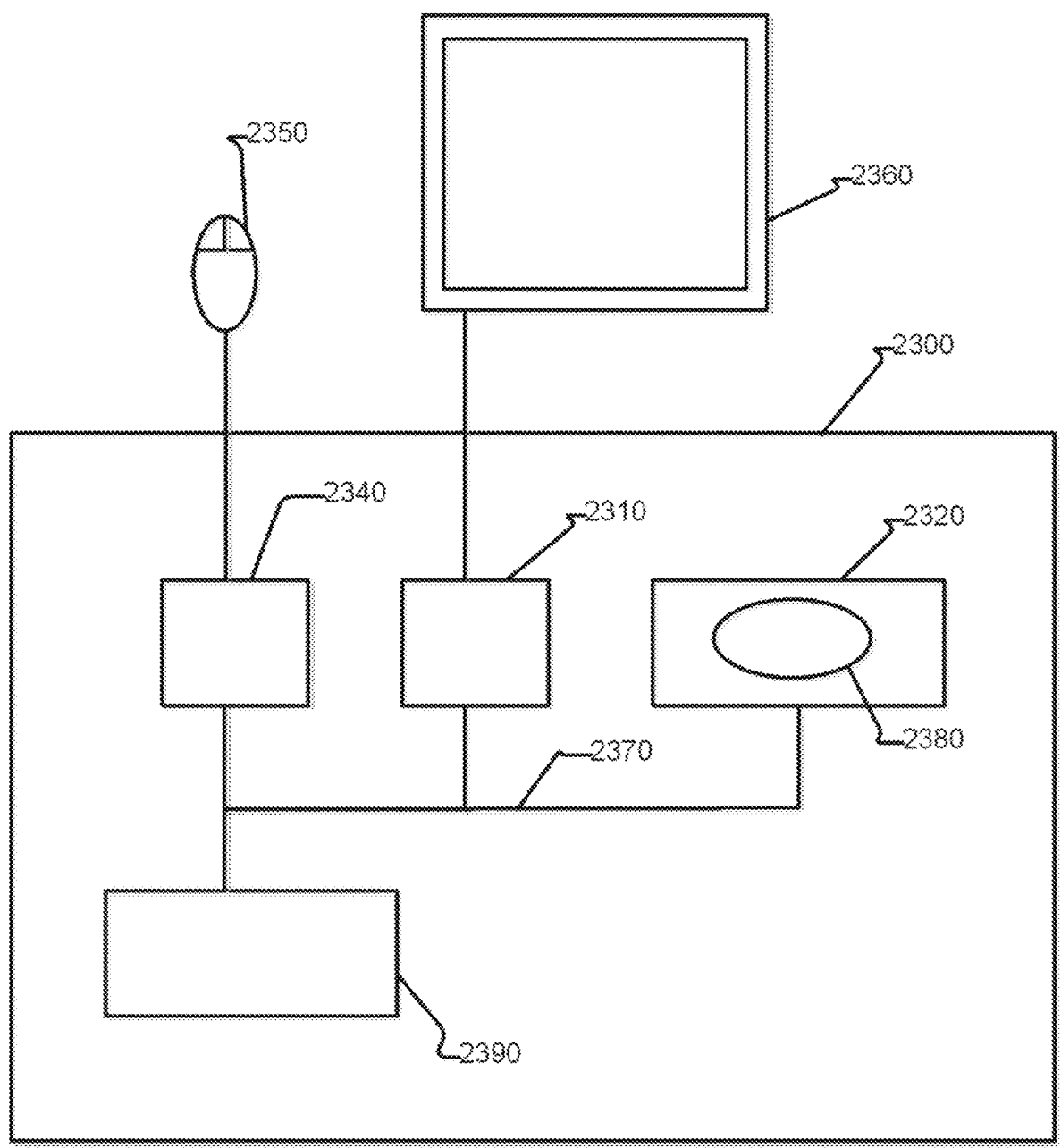
FIG. 23 illustrates an exemplary computing environment that can be used to carry out the method for performing a data exchange according to an exemplary embodiment.

One or more of the above-described techniques can be implemented in or involve one or more computer systems. FIG. 23 illustrates a generalized example of a computing environment 2300. The computing environment 2300 is not intended to suggest any limitation as to scope of use or functionality of a described embodiment.

With reference to FIG. 23, the computing environment 2300 includes at least one processing unit 2310 and memory 2320. The processing unit 2310 executes computer-executable instructions and may be a real or a virtual processor. In a multi-processing system, multiple processing units execute computer-executable instructions to increase processing power. The memory 2320 may be volatile memory (e.g., registers, cache, RAM), non-volatile memory (e.g., ROM, EEPROM, flash memory, etc.), or some combination of the two. The memory 2320 may store software instructions 2380 for implementing the described techniques when executed by one or more processors. Memory 2320 can be one memory device or multiple memory devices.

A computing environment may have additional features. For example, the computing environment 2300 includes storage 2340, one or more input devices 2350, one or more output devices 2360, and one or more communication connections 2390. An interconnection mechanism 2370, such as a bus, controller, or network interconnects the components of the computing environment 2300. Typically, operating system software or firmware (not shown) provides an operating environment for other software executing in the computing environment 2300, and coordinates activities of the components of the computing environment 2300.

The storage 2340 may be removable or non-removable, and includes magnetic disks, magnetic tapes or cassettes, CD-ROMs, CD-RWs, DVDs, or any other medium which can be used to store information and which can be accessed within the computing environment 2300. The storage 2340 may store instructions for the software 2380.

The input device(s) 2350 may be a touch input device such as a keyboard, mouse, pen, trackball, touch screen, or game controller, a voice input device, a scanning device, a digital camera, remote control, or another device that provides input to the computing environment 2300. The output device(s) 2360 may be a display, television, monitor, printer, speaker, or another device that provides output from the computing environment 2300.

The communication connection(s) 2390 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 2300, computer-readable media include memory 2320, storage 2340, communication media, and combinations of any of the above.

Of course, FIG. 23 illustrates computing environment 2300, display device 2360, and input device 2350 as separate devices for ease of identification only. Computing environment 2300, display device 2360, and input device 2350 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 2300 may be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method executed by one or more computing devices for dynamic binding of tasks in a data exchange, the method comprising:

generating, by at least one of the one or more computing devices, an execution plan for the data exchange, the execution plan comprising a plurality of streams, each stream corresponding to a pairing of a producer task and a consumer task and comprising a producer task identifier and a consumer task identifier;

binding, by at least one of the one or more computing devices, each producer task in a plurality of producer tasks to a node in a plurality of nodes at execution time by associating a corresponding producer task identifier with a corresponding node identifier of the node;

binding, by at least one of the one or more computing devices, each consumer task in a plurality of consumer tasks to a node in the plurality of nodes at execution time by associating a corresponding consumer task identifier with a node identifier of the corresponding node; and routing, by at least one of the one or more computing devices, an output of each producer task from a node bound to the producer task to a node bound to a paired consumer task by writing the output to a stream in the plurality of streams that corresponds to the pairing of the producer task and the consumer task.

2. The method of claim 1, wherein each stream is configured to map the output of a corresponding producer task as input to a corresponding consumer task when the consumer task is executed.

3. The method of claim 1, wherein the output of each producer task is written to a corresponding stream in the plurality of streams via a stream application programming interface (API).

4. The method of claim 1, wherein routing an output of each producer task from a node bound to the producer task to a node bound to a paired consumer task by writing the output to a stream in the plurality of streams that corresponds to the pairing of the producer task and the consumer task comprises:

writing the output of the producer task to the stream in the plurality of streams that corresponds to the pairing of the producer task and the consumer task;

detecting execution of the paired consumer task on the node bound to the paired consumer task; and transmitting the output of the producer task from the corresponding stream to the node bound to the paired consumer task.

5. The method of claim 4, wherein the output of the producer task is transmitted from the corresponding stream to the node bound to the paired consumer task without being stored in persistent storage.

6. The method of claim 4, wherein detecting execution of the paired consumer task on the node bound to the paired consumer task comprises:

executing one or more tasks in the plurality of tasks on one or more nodes based at least in part on the execution plan;

transmitting one or more broadcasts indicating the one or more tasks which are being executed on the one or more nodes; and identifying a node in the one or more nodes which is executing the paired consumer task based at least in part on the one or more broadcasts.

7. An apparatus for dynamic binding of tasks in a data exchange, the apparatus comprising:

one or more processors; and one or more memories operatively coupled to at least one of the one or more processors and having instructions stored thereon that, when executed by at least one of the one or more processors, cause at least one of the one or more processors to:

generate an execution plan for the data exchange, the execution plan comprising a plurality of streams, each stream corresponding to a pairing of a producer task and a consumer task and comprising a producer task identifier and a consumer task identifier;

bind each producer task in a plurality of producer tasks to a node in a plurality of nodes at execution time by associating a corresponding producer task identifier with a corresponding node identifier of the node;

bind each consumer task in a plurality of consumer tasks to a node in the plurality of nodes at execution time by associating a corresponding consumer task identifier with a node identifier of the corresponding node; and route an output of each producer task from a node bound to the producer task to a node bound to a paired consumer task by writing the output to a stream in the plurality of streams that corresponds to the pairing of the producer task and the consumer task.

8. The apparatus of claim 7, wherein each stream is configured to map the output of a corresponding producer task as input to a corresponding consumer task when the consumer task is executed.

9. The apparatus of claim 7, wherein the output of each producer task is written to a corresponding stream in the plurality of streams via a stream application programming interface (API).

10. The apparatus of claim 7, wherein the instructions that, when executed by at least one of the one or more processors, cause at least one of the one or more processors to route an output of each producer task from a node bound to the producer task to a node bound to a paired consumer task by writing the output to a stream in the plurality of streams that corresponds to the pairing of the producer task and the consumer task further cause at least one of the one or more processors to:

write the output of the producer task to the stream in the plurality of streams that corresponds to the pairing of the producer task and the consumer task;

detect execution of the paired consumer task on the node bound to the paired consumer task; and transmit the output of the producer task from the corresponding stream to the node bound to the paired consumer task.

11. The apparatus of claim 10, wherein the output of the producer task is transmitted from the corresponding stream to the node bound to the paired consumer task without being stored in persistent storage.

12. The apparatus of claim 10, wherein the instructions that, when executed by at least one of the one or more processors, cause at least one of the one or more processors to detect execution of the paired consumer task on the node bound to the paired consumer task further cause at least one of the one or more processors to:

execute one or more tasks in the plurality of tasks on one or more nodes based at least in part on the execution plan;

transmit one or more broadcasts indicating the one or more tasks which are being executed on the one or more nodes; and identify a node in the one or more nodes which is executing the paired consumer task based at least in part on the one or more broadcasts.

13. At least one non-transitory computer-readable medium storing computer-readable instructions for dynamic binding of tasks in a data exchange that, when executed by one or more computing devices, cause at least one of the one or more computing devices to:

generate an execution plan for the data exchange, the execution plan comprising a plurality of streams, each stream corresponding to a pairing of a producer task and a consumer task and comprising a producer task identifier and a consumer task identifier;

bind each producer task in a plurality of producer tasks to a node in a plurality of nodes at execution time by associating a corresponding producer task identifier with a corresponding node identifier of the node;

bind each consumer task in a plurality of consumer tasks to a node in the plurality of nodes at execution time by associating a corresponding consumer task identifier with a node identifier of the corresponding node; and route an output of each producer task from a node bound to the producer task to a node bound to a paired consumer task by writing the output to a stream in the plurality of streams that corresponds to the pairing of the producer task and the consumer task.

14. The apparatus of claim 13, wherein each stream is configured to map the output of a corresponding producer task as input to a corresponding consumer task when the consumer task is executed.

15. The apparatus of claim 13, wherein the output of each producer task is written to a corresponding stream in the plurality of streams via a stream application programming interface (API).

16. The apparatus of claim 13, wherein the instructions that, when executed by at least one of the one or more computing devices, cause at least one of the one or more computing devices to route an output of each producer task from a node bound to the producer task to a node bound to a paired consumer task by writing the output to a stream in the plurality of streams that corresponds to the pairing of the producer task and the consumer task further cause at least one of the one or more computing devices to:

write the output of the producer task to the stream in the plurality of streams that corresponds to the pairing of the producer task and the consumer task;

detect execution of the paired consumer task on the node bound to the paired consumer task; and transmit the output of the producer task from the corresponding stream to the node bound to the paired consumer task.

17. The apparatus of claim 16, wherein the output of the producer task is transmitted from the corresponding stream to the node bound to the paired consumer task without being stored in persistent storage.

18. The apparatus of claim 16, wherein the instructions that, when executed by at least one of the one or more computing devices, cause at least one of the one or more computing devices to detect execution of the paired consumer task on the node bound to the paired consumer task further cause at least one of the one or more computing devices to:

execute one or more tasks in the plurality of tasks on one or more nodes based at least in part on the execution plan;

transmit one or more broadcasts indicating the one or more tasks which are being executed on the one or more nodes; and identify a node in the one or more nodes which is executing the paired consumer task based at least in part on the one or more broadcasts.

* * * * *